United States Patent
Sano

(10) Patent No.: US 8,179,613 B2
(45) Date of Patent: May 15, 2012

(54) IMAGE PICKUP LENS, IMAGE PICKUP APPARATUS AND PORTABLE TERMINAL

(75) Inventor: Eigo Sano, Hino (JP)

(73) Assignee: Konica Minolta Opto, Inc., Tokyo (JP)

(*) Notice: Subject to any disclaimer, the term of this patent is extended or adjusted under 35 U.S.C. 154(b) by 174 days.

(21) Appl. No.: 12/664,877

(22) PCT Filed: Jul. 8, 2009

(86) PCT No.: PCT/JP2009/062438
§ 371 (c)(1),
(2), (4) Date: Dec. 15, 2009

(87) PCT Pub. No.: WO2011/004467
PCT Pub. Date: Jan. 13, 2011

(65) Prior Publication Data
US 2011/0188131 A1    Aug. 4, 2011

(51) Int. Cl.
*G02B 3/02* (2006.01)
*G02B 13/18* (2006.01)

(52) U.S. Cl. .................. 359/714; 359/708

(58) Field of Classification Search ............... 359/708, 359/714, 713
See application file for complete search history.

(56) References Cited

U.S. PATENT DOCUMENTS
7,480,105 B2 * 1/2009 Mori ............... 359/770

FOREIGN PATENT DOCUMENTS
JP    2007-264180    10/2007
JP    2007-279282    10/2007

* cited by examiner

*Primary Examiner* — James Greece
(74) *Attorney, Agent, or Firm* — Cozen O'Connor

(57) ABSTRACT

The image pickup lens includes a first positive lens (focal distance: f1) having the convex surface facing the object side, a second negative lens having the concave surface facing the image side, a third positive lens (focal distance: f3) having the convex surface facing the image side, a fourth positive meniscus lens having the convex surface facing the image side, and a fifth negative lens having the concave surface facing the image side, arranged in that order as viewed from the object side. The surface of the fifth lens on the image side is aspherical, and an inflection point is located at a position other than the intersection point with the optical axis. The aperture stop is located closer to the image than the first lens, and the conditional expression (1) is met: $0.8 < f3/f1 < 2.6$.

16 Claims, 27 Drawing Sheets

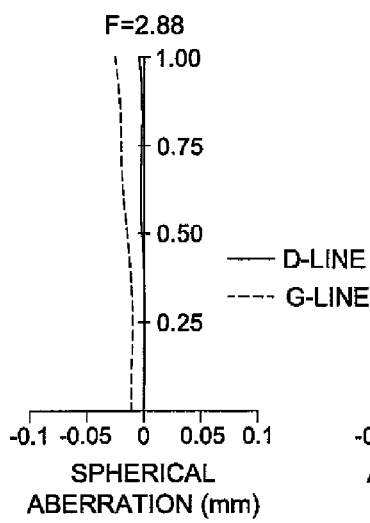
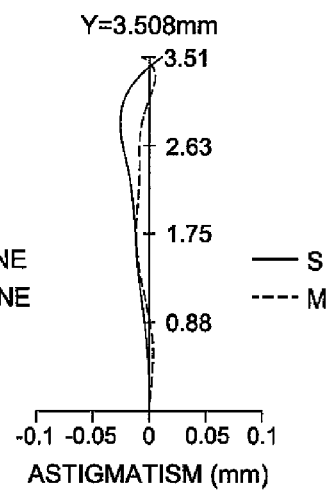
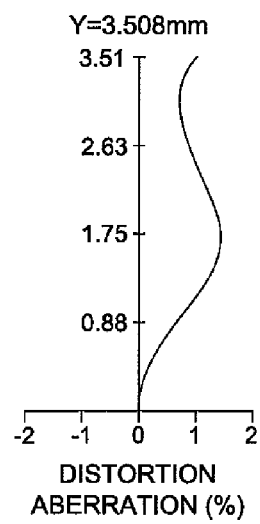
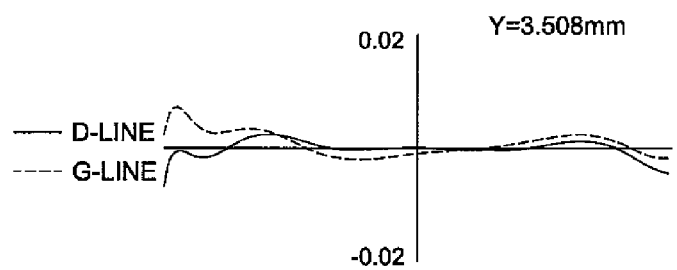
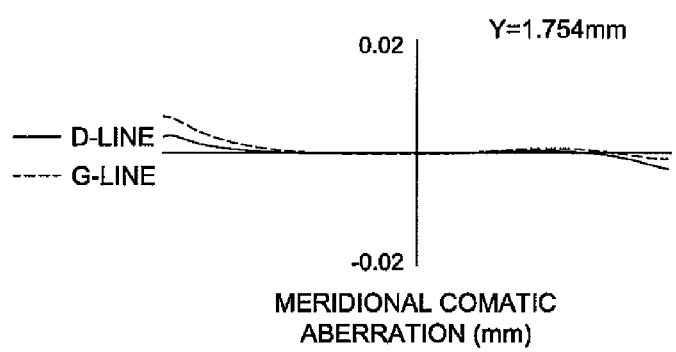

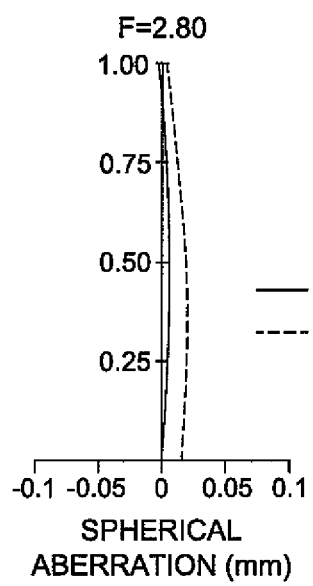
FIG. 4a
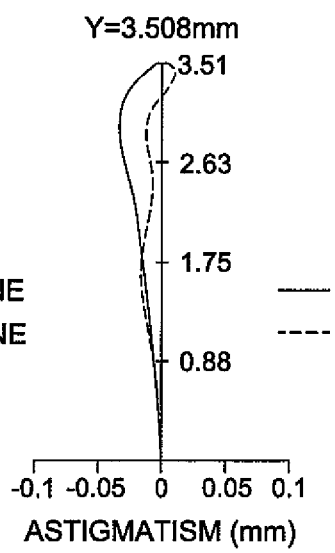
FIG. 4b
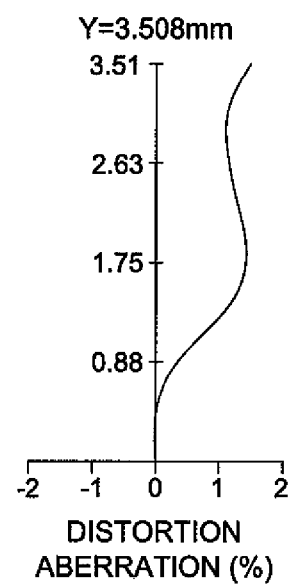
FIG. 4c
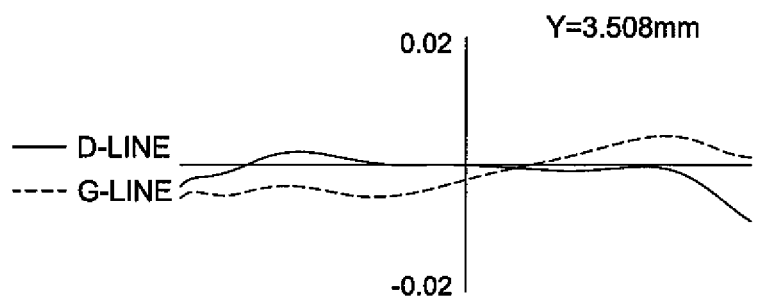
FIG. 4d
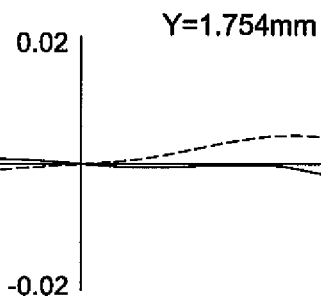
MERIDIONAL COMATIC ABERRATION (mm)

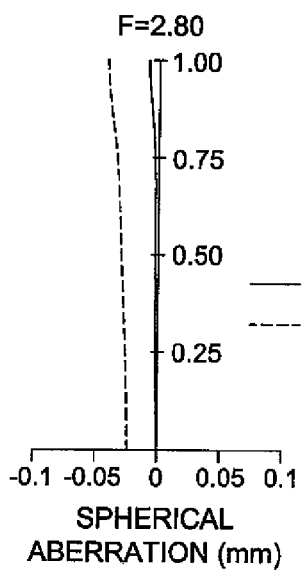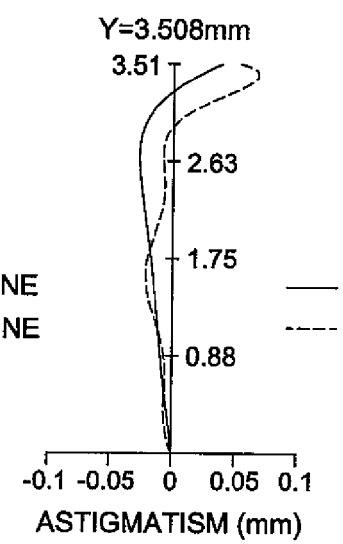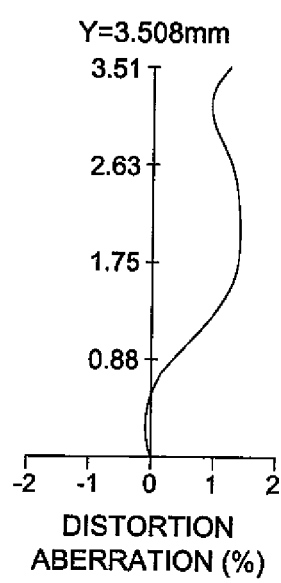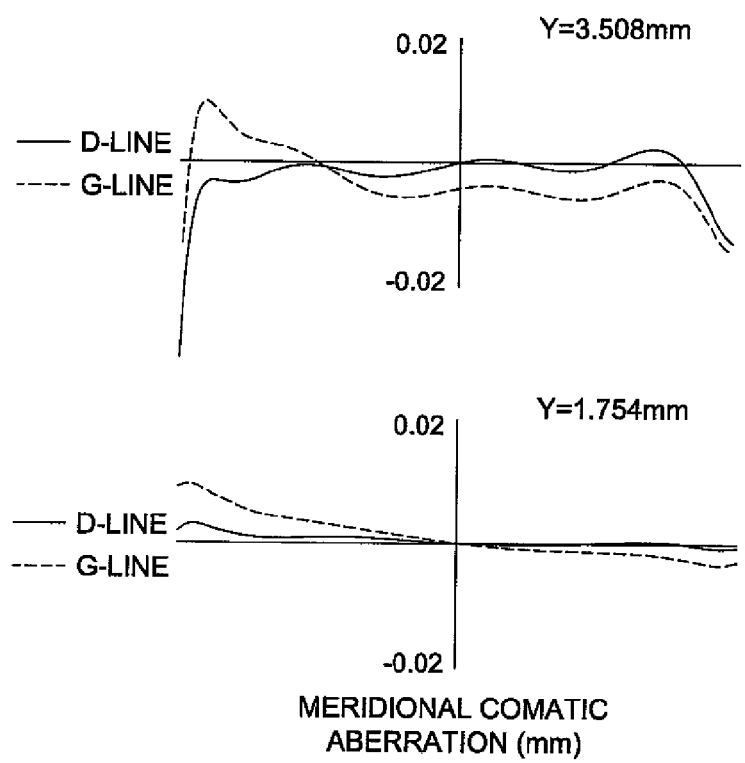

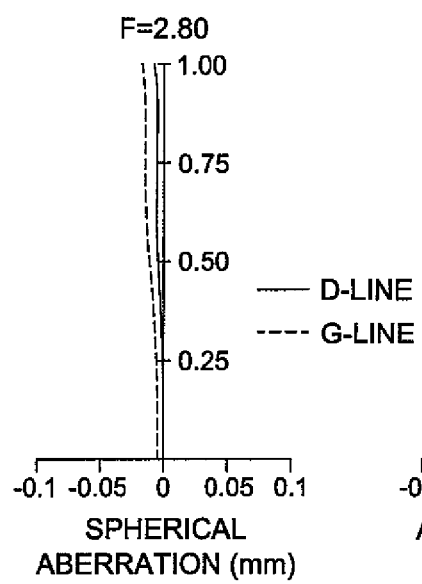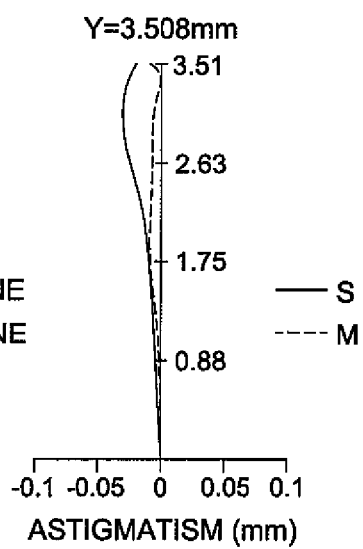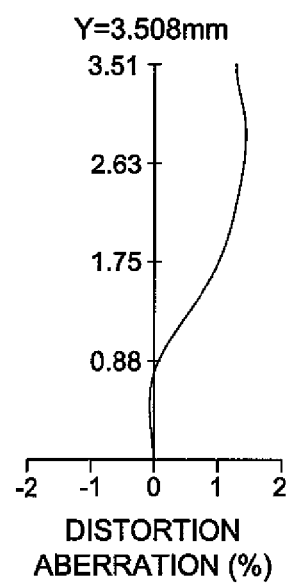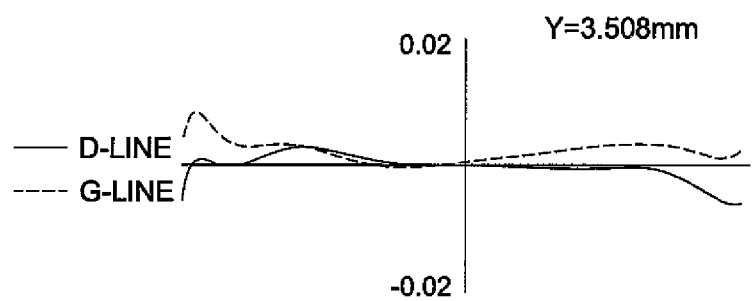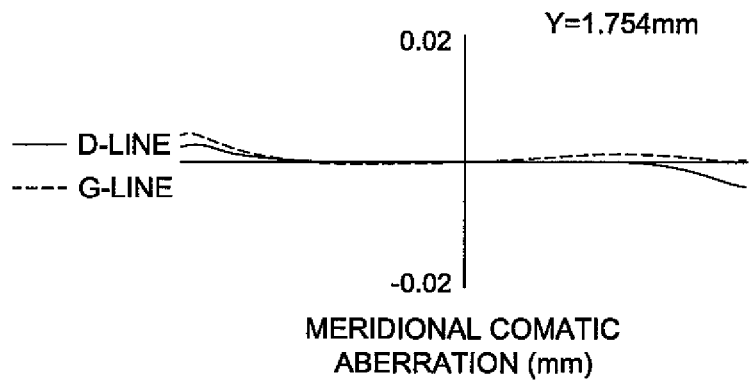

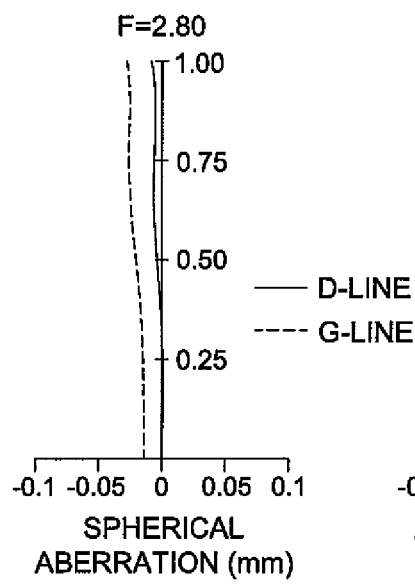
FIG. 10a
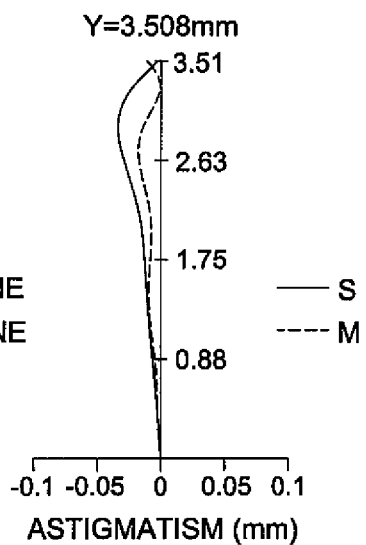
FIG. 10b
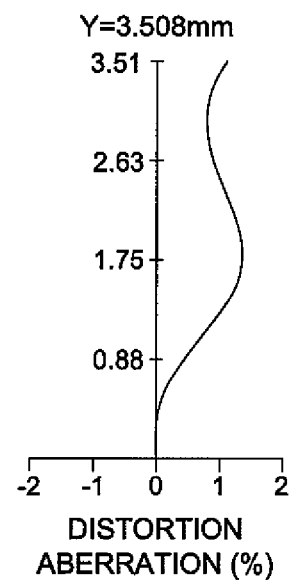
FIG. 10c
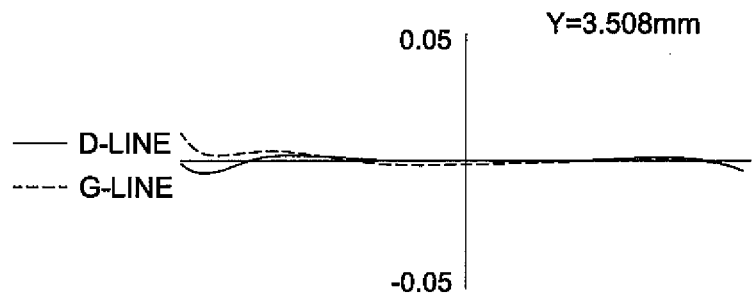
FIG. 10d
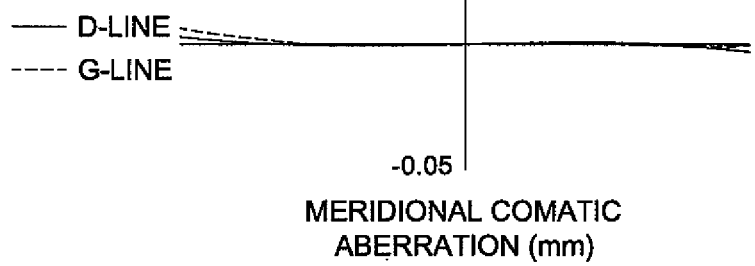
MERIDIONAL COMATIC
ABERRATION (mm)

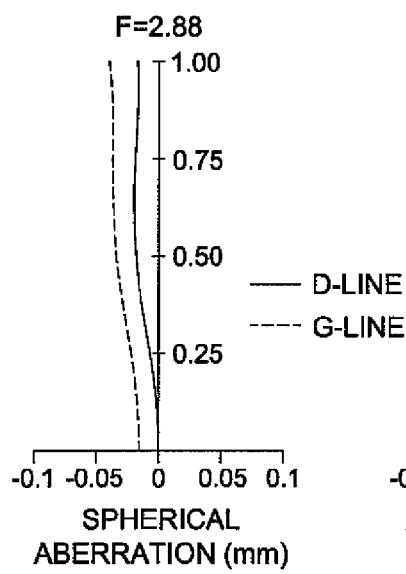
FIG. 12a
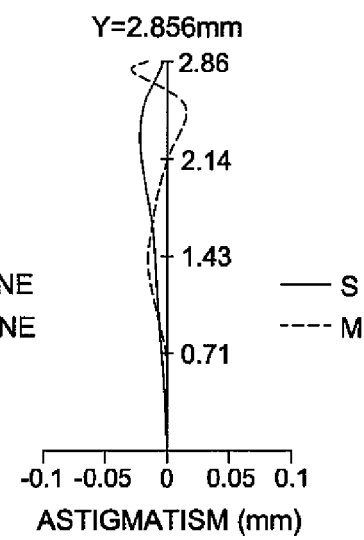
FIG. 12b
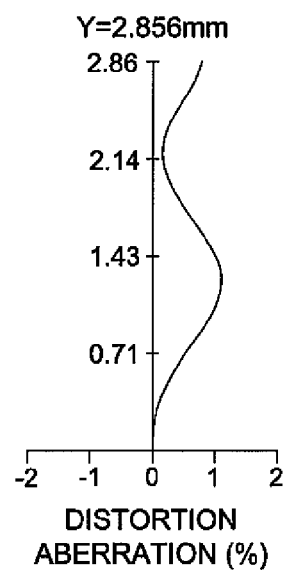
FIG. 12c
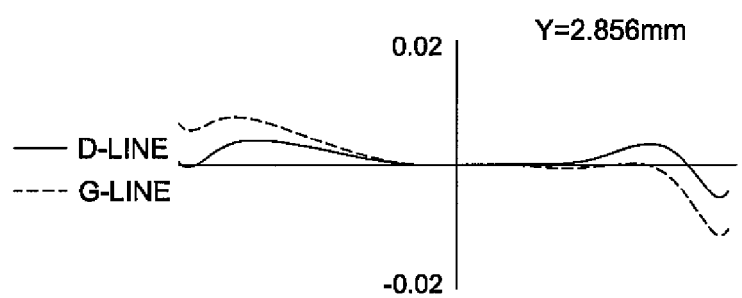
FIG. 12d
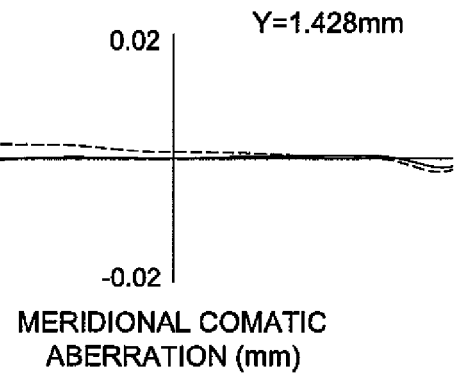

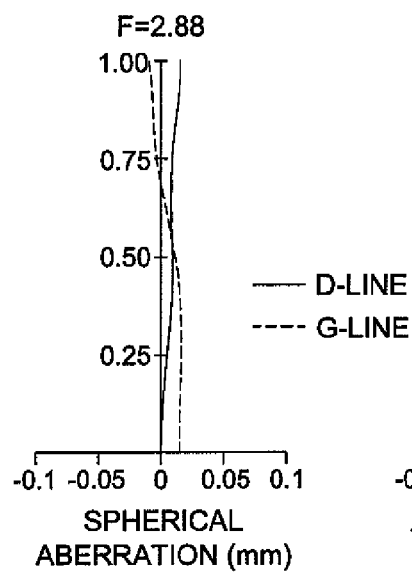
FIG. 14a
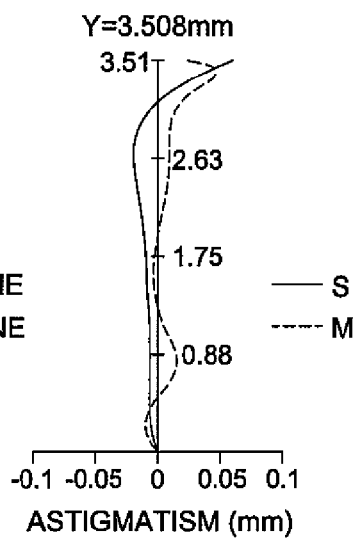
FIG. 14b
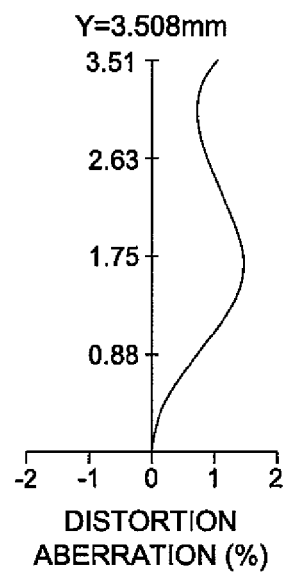
FIG. 14c
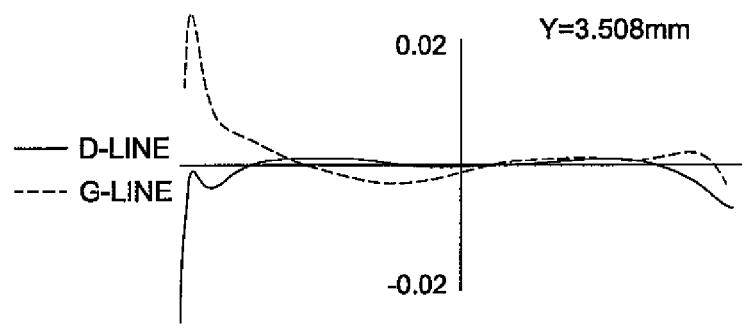
FIG. 14d
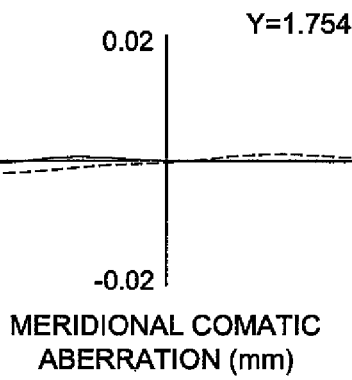
MERIDIONAL COMATIC ABERRATION (mm)

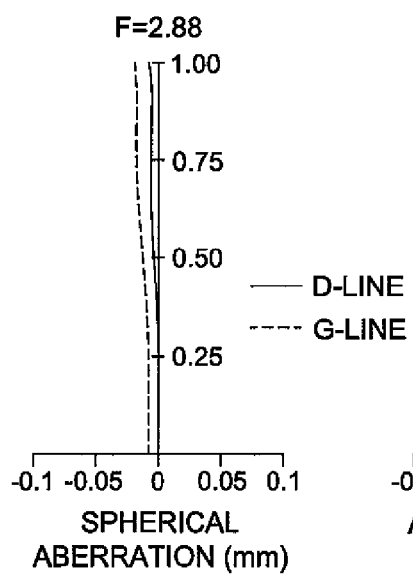 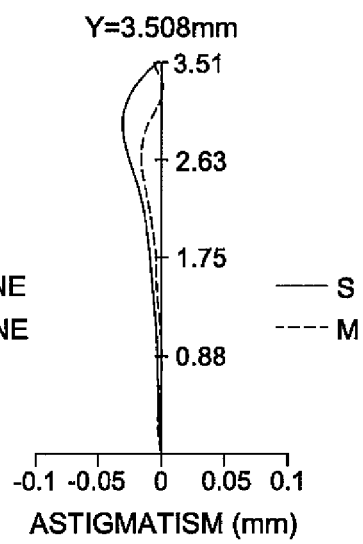 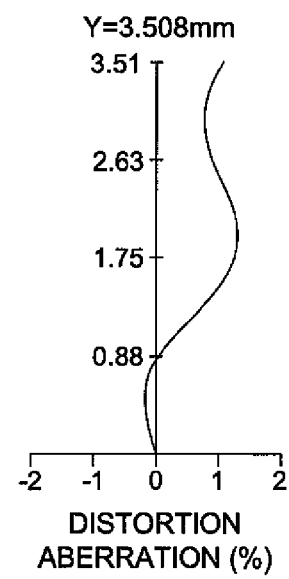
FIG. 16a  FIG. 16b  FIG. 16c
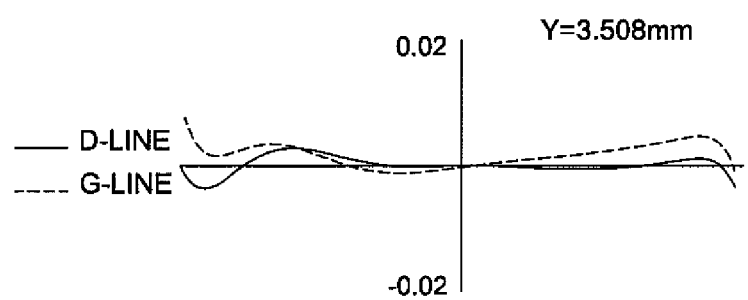
FIG. 16d
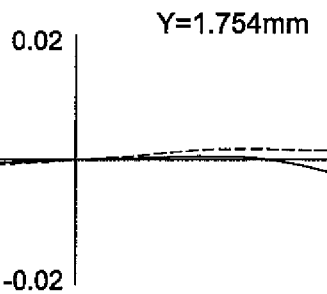
MERIDIONAL COMATIC ABERRATION (mm)

FIG. 18a
F=2.80
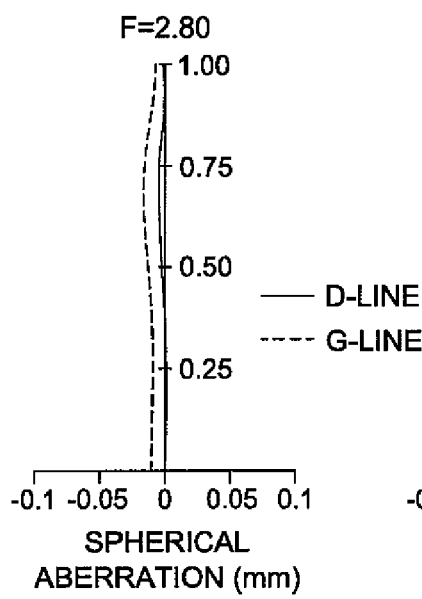
SPHERICAL ABERRATION (mm)
FIG. 18b
Y=3.508mm
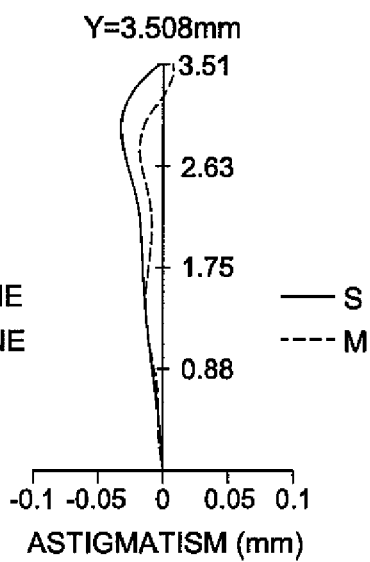
ASTIGMATISM (mm)
FIG. 18c
Y=3.508mm
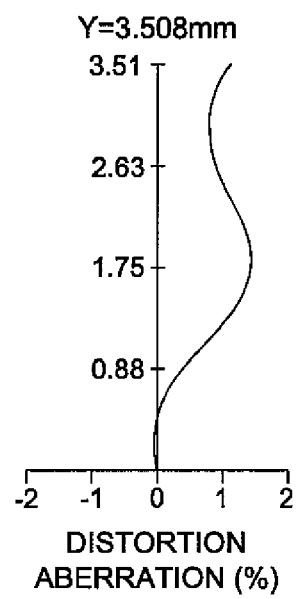
DISTORTION ABERRATION (%)
FIG. 18d
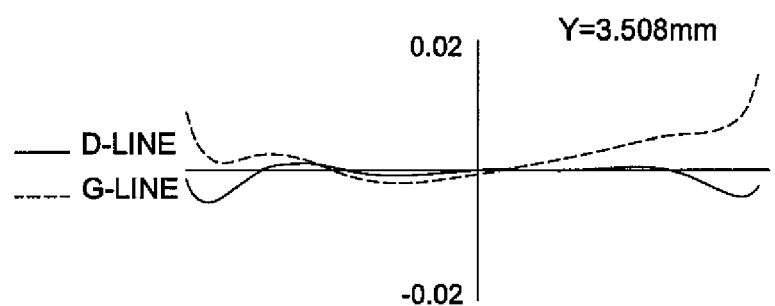
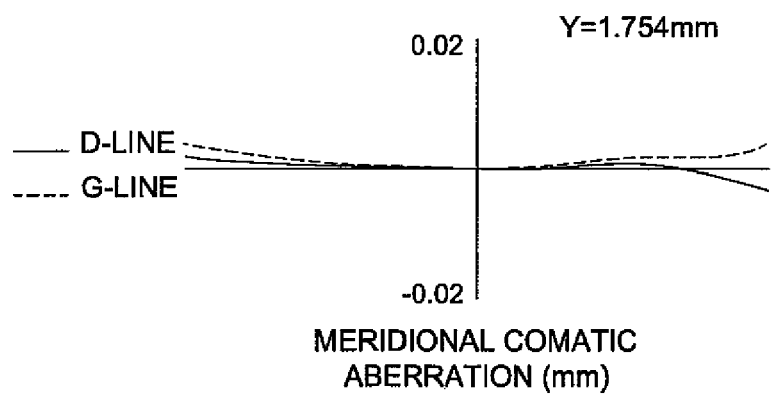
MERIDIONAL COMATIC ABERRATION (mm)

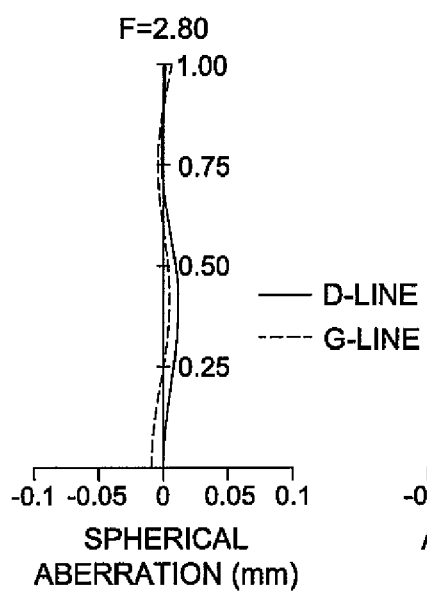
FIG. 20a
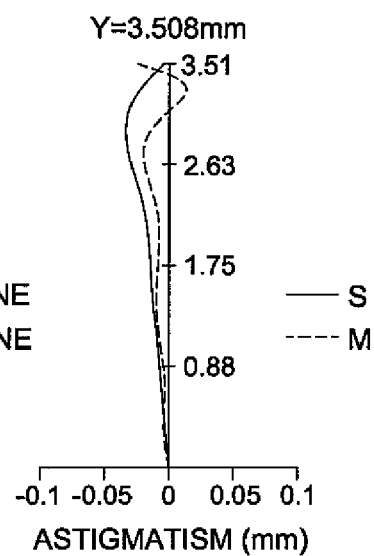
FIG. 20b
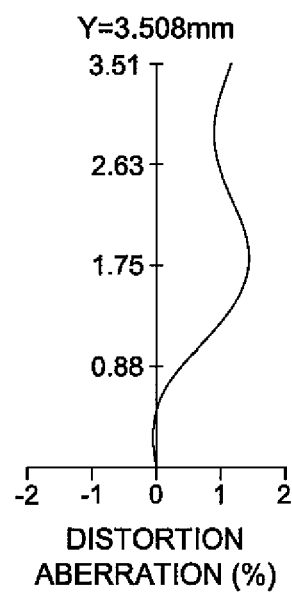
FIG. 20c
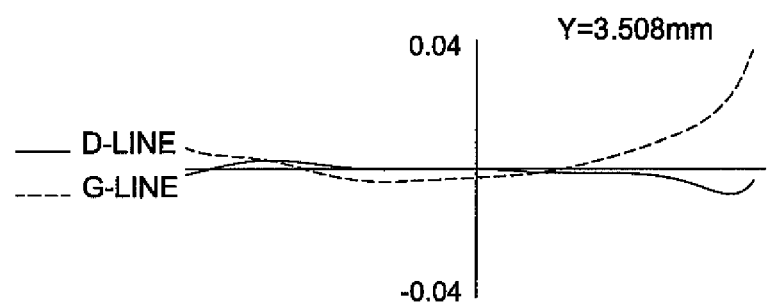
FIG. 20d
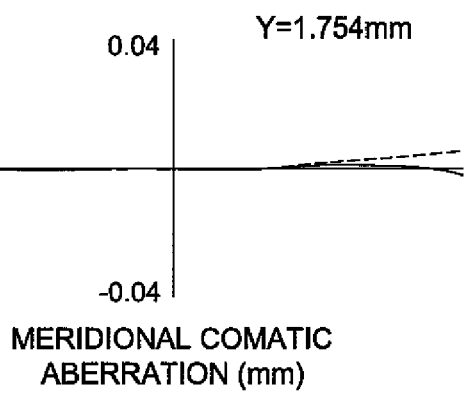

FIG. 22a
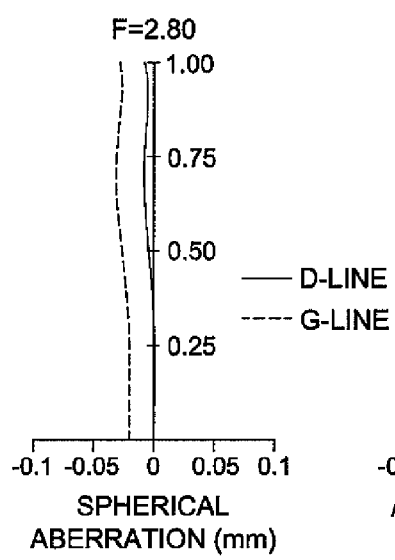
SPHERICAL ABERRATION (mm)
FIG. 22b
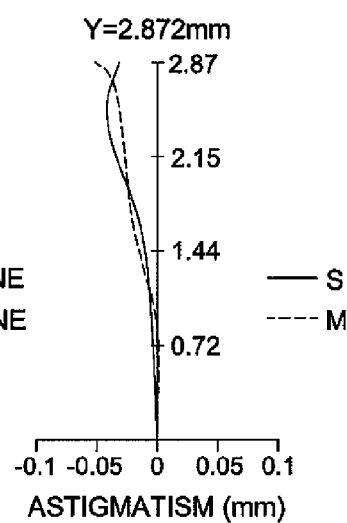
ASTIGMATISM (mm)
FIG. 22c
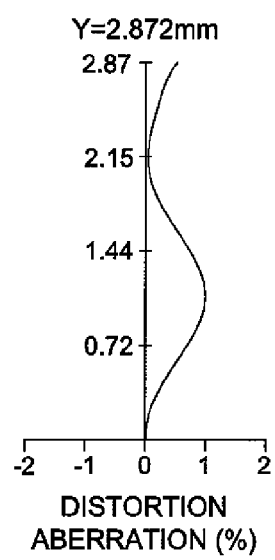
DISTORTION ABERRATION (%)
FIG. 22d
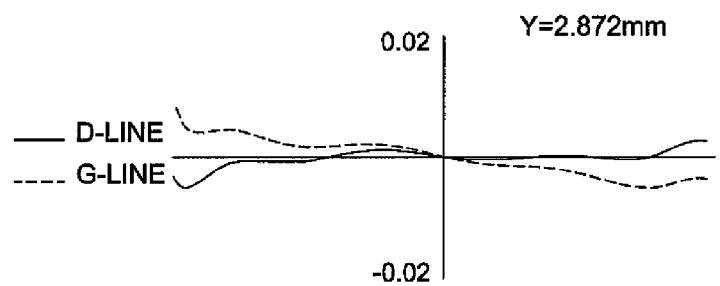
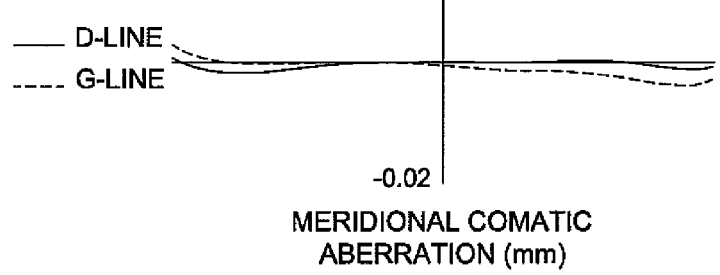
MERIDIONAL COMATIC ABERRATION (mm)

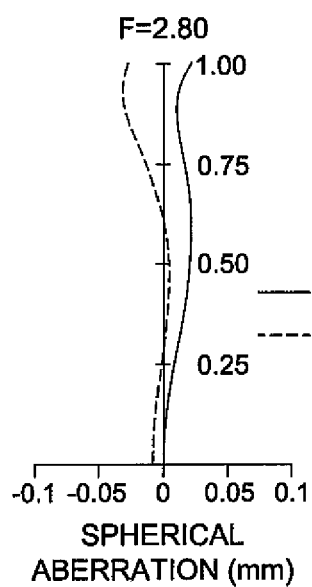
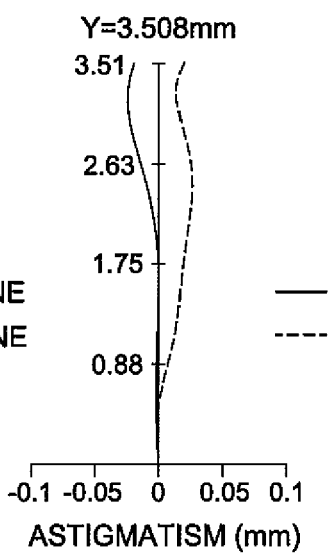
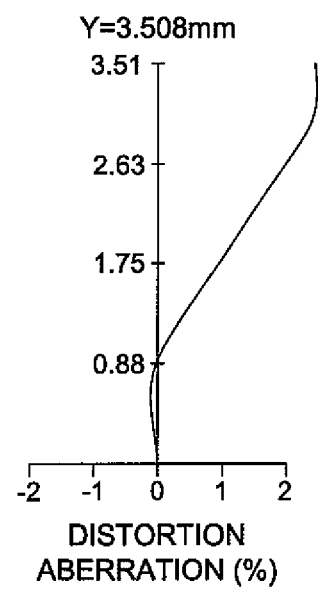
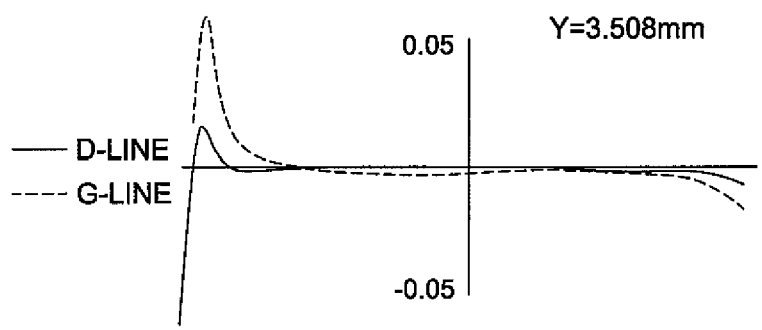
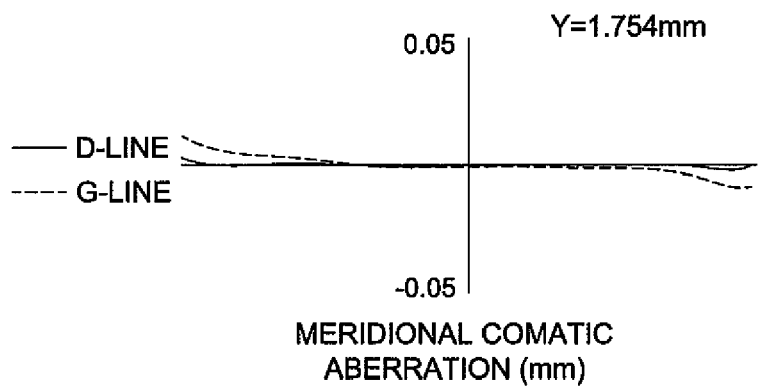

IMAGE PICKUP LENS, IMAGE PICKUP APPARATUS AND PORTABLE TERMINAL

RELATED APPLICATIONS

This is a U.S. National Phase Application under 35 U.S.C. 371 of International Application PCT/JP2009/062438, filed on Jul. 8, 2009.

FIELD OF THE INVENTION

The present invention relates to a compact image pickup lens and an image pickup apparatus using such a solid pickup element as a CCD image sensor or CMOS image sensor, and a portable terminal provided therewith.

DESCRIPTION OF RELATED ART

To catch up with increasingly higher high performances and smaller configuration of pickup elements using such a solid pickup element as a CCD (Charge Coupled Device) image sensor or a CMOS (Complementary Metal Oxide Semiconductor) image sensor in recent years, there has been a widespread use of mobile phones and personal digital assistants equipped with an image pickup apparatus. At the same time, further downsizing and higher performances are the requirements imposed on the image pickup lens mounted on the above-mentioned image pickup apparatus. As an image pickup lens for such an application, an image pickup lens with a five-lens structure has been proposed because performances can be further improved as compared to the image pickup element of three- or four-lens structures.

As an image pickup lens with a five-lens structure, an image pickup lens is disclosed, which is provided with a first lens having a positive refractive power, a second lens having a negative refractive power, a third lens having a positive refractive power, a fourth lens having a negative refractive power, and a fifth lens having a negative refractive power, arranged in that order as viewed from an object (for example, Patent Literature 1).

Another image pickup lens disclosed as one with a five-lens structure is provided with a first lens having a negative refractive power, a second lens having a positive refractive power, a third lens having a negative refractive power, a fourth lens having a positive refractive power, and a fifth lens having a negative refractive power arranged in that order as viewed from an object (for example, Patent Literature 2).

EARLIER TECHNICAL LITERATURE

Patent Literature

Patent Literature 1: Japanese Patent Application Publication No. 2007-264180
Patent Literature 2: Japanese Patent Application Publication No. 2007-279282

SUMMARY OF THE INVENTION

Problems to be Solved by the Invention

In the image pickup lens described in the above-mentioned Patent Literature 1, however, the first through third lenses take charge of almost all the refractive power of the entire system, and the fourth and fifth lenses only serve as the image surface correcting lenses of poor refractive power. Thus, the aberration is corrected only insufficiently. If the total length of the lens is reduced, difficulties will arise in achieving a higher pixilation of the pickup element because of poor performance.

In the image pickup lens of Patent Literature 2, the front group made up of the first and second lenses constitutes the spherical system, and the spherical aberration and comatic aberration are corrected only insufficiently. Thus, excellent performance cannot be ensured. Both the front group and the rear group made of the third and later lenses have positive refractive power. As compared to the telephoto type wherein the rear group has a negative refractive power, the principal point of the optical system is located on the image side, and the back focus is prolonged. This is not very helpful in achieving a downsized structure.

In view of the problems described above, it is an object of the present invention to provide a five-lens structure image pickup lens wherein various forms of aberrations are corrected to a satisfactory level, despite a more compact configuration than the conventional type, whereby a compact and high-performance image pickup apparatus and portable terminal is provided.

To describe a measure of evaluating the compact image pickup lens in the sense in which the term is used here, the present invention is intended to achieve compact configuration on the level meeting the following formula (11). If this requirement is met, the compact and lightweight structure of the entire pickup apparatus can be achieved:

$$L/2Y<1.00 \tag{11}$$

wherein L denotes the distance on the optical axis from the surface of the entire image pickup lens closest to the object side to the focal point on the image side, and 2Y denotes the diagonal length on the image pickup surface of the solid pickup element (diagonal length in the rectangular effective pixel area of the solid pickup element). It should be noted, in passing, that the focal distance on the image side refers to the image point when the light parallel to the optical axis has entered the image pickup lens.

When a parallel flat plate such as an optical low pass filter, IR (infrared ray) cut filter or seal glass of a solid pickup element package is placed between the surface of the entire image pickup lens closest to the object side and the focal point on the image side, the above-mentioned value L is calculated after the parallel flat plate portion has been converted to the value equivalent length in air.

More preferably, the following formula (11) is met:

$$L/2Y<0.90 \tag{11}'$$

Means for Solving the Problems

To solve the above-mentioned problems, the invention described in claim 1 is an image pickup lens for forming a subject image on a photoelectric conversion section of a solid image pickup element, the image pickup lens comprising, in order from an object side thereof:

a first lens having a positive refractive power with a convex surface on the object side;

a second lens having a negative refractive power with a concave surface on an image side;

a third lens having a positive refractive power with a convex surface on the image side;

a fourth lens having a positive refractive power and a meniscus shape with a convex surface on the image side; and a fifth lens having a negative refractive power with a concave surface on the image side, characterized in that the surface of the fifth lens on the image side is aspherical, and an inflection point is located at a position other than an intersection point with an optical axis; an aperture stop is located closer to the image than the first lens, and the conditional expression (1) is met:

$$0.8 < f3/f1 < 2.6 \quad (1)$$

wherein f3 is a focal distance of the third lens and f1 is a focal distance of the first lens.

The so-called telephoto lens configuration wherein a positive lens including a first lens, second lens, third lens and fourth lens, and a negative fifth lens are arranged in that order as viewed from an object is advantageous in reducing the overall length of an image pickup lens. Further, two lenses in a five-lens structure are formed as negative lenses. This arrangement increases the number of the surfaces having diverging effects, and ensures easy correction of the Petzval sum, thereby producing an image pickup lens characterized by excellent image forming performances up to all the corners of the screen.

The aperture stop is arranged closer to the image than the first lens. This arrangement ensures that the lenses before and after the aperture stop are formed in a shape closely symmetrical with the aperture stop sandwiched in-between, and permits easy correction of comatic aberration, lateral chromatic aberration and distortion aberration.

When the image side surface of the fifth lens placed closest to the image is made aspherical, various forms of aberrations on the periphery of the screen can be corrected to a satisfactory level. Further, the aspherical configuration having an inflection point at a position other than the crossing point with the optical axis easily ensures the telecentric properties of the light flux on the image side.

The "inflection point" in the sense in which it is used here refers to an aspherical point on a curve of sectional configuration within the effective radius wherein the tangential plane of the aspherical apex is perpendicular to the optical axis.

The conditional expression (1) is intended to set the ratio of the focal distance between the third and first lenses properly and to ensure compatibility between reduction in the sensitivity to eccentric errors resulting from reduction in the overall length of the image pickup lens and correction of aberrations.

When the value of the conditional expression (1) is below the upper limit, the refractive power of the first lens can be kept at an appropriate level, and the composite principal point from the first lens to the fourth lens can be located closer to the object, whereby the overall length of the image pickup lens is reduced. In the meantime, when the value of the conditional expression (1) is above the lower limit, the load of the refractive power of the first lens is partially shared by the third lens in a proper manner, thereby reducing the sensitivity to eccentric errors which tend to increase as a result of reduction in height (reduction in the overall length of the image pickup lens). Further, it is also possible to reduce the high-order spherical aberration and comatic aberration occurring to the first lens. It should be noted in passing that sensitivity to eccentric errors refers to the sensitivity to the deterioration in optical performance when an eccentric error has taken place.

More preferably, the following expression is met:

$$0.9 < f3/f1 < 2.4 \quad (1)'$$

The image pickup lens described in claim 2, in the invention described in claim 1, is characterized in that the aperture stop is arranged between the first lens and the second lens.

According to the invention of claim 2, the focal distance of the first lens is defined within the range of conditional expression (1). After that, the radius of the surface of the first lens on the object side is reduced, and a higher refractive power is set, whereby the composite principal point position of the entire system can be arranged closer to the object, and the overall length of the image pickup lens can be reduced. However, if the aperture stop is located closer to the object than the first lens, the marginal light passing through the surface of the first lens on the object side will be subjected to excessive bending. This will cause conspicuous comatic aberration and lateral chromatic aberration on the periphery. To avoid this, the aperture stop is positioned between the first lens and second lens. This arrangement ensures that the angle of refraction of the marginal light passing through the surface of the first lens on the object side is not excessively increased, even if the radius of the first lens on the object side is reduced. This ensures compatibility between downsizing of the image pickup lens and correction of the aberration in a satisfactory manner.

The image pickup lens described in claim 3, in the invention described in claim 1, is characterized in that the aperture stop is located between the second lens and the third lens.

According to the invention of claim 3, the aperture stop is arranged between the second and third lenses, whereby the second and third lenses can be made into a form that is close to symmetrical, with the aperture stop sandwiched in-between. Thus, the comatic aberration occurring to the second and third lenses can be corrected to a satisfactory level. Further, this structure permits easy correction of the lateral chromatic aberration and distortion aberration of the entire image pickup lens.

The image pickup lens described in claim 4, in the invention described in any one of claims 1 through 3, is characterized in that the following conditional expression (2) is satisfied:

$$50 < v3 < 72 \quad (2)$$

wherein v3 denotes an Abbe's number of the third lens.

The conditional expression (2) is intended for proper setting of the Abbe's number of the third lens and for satisfactory correction of the chromatic aberration on the periphery.[3]

If the value of the conditional expression (2) has exceeded the upper limit, only the material of the lower refractive index can be selected. If an attempt is made to get the same refractive power, the radius is reduced, off-axis aberration is deteriorated, and sensitivity to eccentric errors is increased. In the meantime, if the value of the conditional expression (2) is below the lower limit, correction of the chromatic aberration will be insufficient and contrast will be reduced, with the result that the image quality will be reduced.

The image pickup lens described in claim 5, in the invention described in any one of claims 1 through 4, is characterized in that the following conditional expression (3) is satisfied:

$$0.0 < (R5+R6)/(R5-R6) < 2.5 \quad (3)$$

where R5 denotes a curvature radius of the surface of a third lens on the object side, and R6 denotes a curvature radius of the surface of a third lens on the image side.

The conditional expression (3) is intended for proper setting of the configuration of the third lens.

When the value of the conditional expression is above the lower limit of the conditional expression (3), it is possible to mitigate a steep angle of the light that enters the third lens after having been reflected from the surface of the second lens on the image side, whereby generation of the off-axis aberration can be reduced. In the meantime, when the value of the conditional expression is kept below the upper limit of the conditional expression (3), the composite principal point position of the first through third lenses is prevented from moving far to the image side, while the load of the refractive power of the first lens is being shared. This arrangement reduces the overall length.

More preferably, the following expression is met:

$$0.1 < (R5+R6)/(R5-R6) < 2.4 \quad (3)'$$

The image pickup lens described in claim 6, in the invention described in any one of claims 1 through 5, is characterized in that the following conditional expression (4) is satisfied:

$$-0.7 < R7/f < -0.3 \quad (4)$$

wherein R7 denotes a curvature radius of a fourth lens on the object side, and f indicates a focal distance of an entire image pickup lens system.

The conditional expression (4) is intended for proper setting of the radius of the surface of the fourth lens on the object side.

When the value of the conditional expression is above the lower limit of the conditional expression (4), it is possible to reduce the incident angle of the off-axis light on the surface of the fourth lens on the object side, whereby generation of the off-axis aberration can be reduced. In the meantime, when the value of the conditional expression is kept below the upper limit of the conditional expression (4), the clearance of the third and fourth lenses can be maintained at an appropriate level.

More preferably, the following expression is met:

$$-0.65 < R7/f < -0.35 \quad (4)'$$

The image pickup lens described in claim 7, in the invention described in any one of claims 1 through 6, is characterized in that the following conditional expression (5) is satisfied:

$$-0.7 < f5/f < -0.3 \quad (5)$$

wherein f5 indicates a focal distance of the fifth lens, and f indicates a focal distance of the entire image pickup lens system.

The conditional expression (5) is intended for proper setting of the focal distance of the fifth lens.

When the value of the conditional expression is kept below the upper limit of the conditional expression (5), the negative refractive power of the fifth lens is prevented from being excessively increased. This avoids excessive reflection of the light flux forming an image on the periphery of the image pickup surface of the solid pickup element and easily ensures the telecentric properties of the light flux on the image side. In the meantime, when the value of the conditional expression is kept above the lower limit of the conditional expression (5), the negative refractive power of the fifth lens is maintained at an appropriate level and the overall length of the lens can be reduced. Further, the curvature of the image surface and various forms of off-center axis aberrations such as distortion aberration can be corrected to a satisfactory level.

More preferably, the following expression is met:

$$-0.65 < f5/f < -0.35 \quad (5)'$$

The image pickup lens described in claim 8, in the invention described in any one of claims 1 through 7, is characterized in that a surface of the second lens on the image side is designed in such an aspherical shape that the negative refractive power is smaller at a position father from the optical axis toward a periphery.

According to the image pickup lens of claim 8, the surface of the second lens on the image side is designed in such an aspherical shape that the negative refractive power is reduced as one travels the surface of the second lens on the image side from the center toward the periphery. This eliminates the possibility of the light being excessively reflected, and provides excellent telecentric properties on the periphery after various forms of off-axis aberrations have been corrected in a satisfactory manner.

The image pickup lens described in claim 9, in the invention described in any one of the claims 1 through 8, is characterized in that the following conditional expression is met:

$$15 < \nu 2 < 31 \quad (6)$$

wherein ν2 denotes an Abbe's number of the second lens.

The conditional expression (6) is intended for proper setting of the Abbe's number of the second lens.

When the value of the conditional expression is kept below the upper limit of the conditional expression (6), the dispersion of the second lens can be increased to an appropriate level. While the refractive power of the second lens is kept suppressed, the chromatic aberrations such as on-axis chromatic aberration and lateral chromatic aberration can be corrected to a satisfactory level. In the meantime, when the value of the conditional expression is kept above the lower limit of the conditional expression (6), easily available materials can be used to design the structure.

More preferably, the following formula (6)' is met:

$$15 < \nu 2 < 24 \quad (6)'$$

Still more preferably, the following formula (6)":

$$15 < \nu 2 < 21 \quad (6)''$$

The image pickup lens described in claim 10, in the invention described in any one of claims 1 through 9, is characterized in that the following conditional expression (7) is met:

$$1.60 < N2 < 2.10 \quad (7)$$

wherein N2 indicates a refractive index of the second lens.

The conditional expression (7) is intended to correct the chromatic aberration and curvature of the image surface of the entire image pickup lens system to a satisfactory level.

When the value of the conditional expression is above the lower limit of the conditional expression (7), the refractive power of the second lens characterized by greater dispersion can be maintained at an appropriate level, and the chromatic aberration and curvature of the image surface can be corrected to a satisfactory level. In the meantime, when the value of the conditional expression is kept below the upper limit of the conditional expression (7), easily available materials can be used to design the structure.

More preferably, the following formula (7)' is met:

$$1.63 < n2 < 2.00 \quad (7)'$$

Still more preferably, the following formula (7)":

$$1.648 < n2 < 2.00 \quad (7)''$$

The image pickup lens described in claim 11, in the invention described in any one of claims 1 through 10, is characterized in that adjustments of a focal point position in an auto-focusing and macro switchover functions of the image pickup lens are performed by moving the first through third lenses, and the following conditional expression (8) is met:

$$0.04 < D6/f < 0.25 \quad (8)$$

wherein D6 denotes an on-axis air clearance of the third and fourth lenses and f indicates a focal distance of an entire image pickup lens system.

When an attempt is made to adjust the focal point position in the auto-focusing and macro switchover functions, it is a common practice to perform an overall feedout operation wherein the entire lens group in the optical axis is moved. It is also possible to perform a partial group feed-out operation wherein part of the lens group, e.g., the first through third lenses are moved in the direction of the optical axis to adjust the focal point position. If the partial group feed-out operation is performed, it is possible to minimize the deterioration of the performance at the time of adjusting the focal point position to a short distance, depending on the type of the optical system. Since only part of the group—not the entire group—is to be moved, the drive mechanism can be simplified, and the entire image pickup apparatus can be designed in a compact and lightweight structure.

When performing the partial feed-out operation, air clearance on the optical axis of the third and fourth lenses is preferably set to meet the conditional expression (8).

When the value of the conditional expression (8) is kept above the lower limit, the sufficient stroke at the time of partial feed-out operation using the first through third lenses can be ensured. Further, positive refractive power around the fourth lens can be maintained at an appropriate level, the lateral chromatic aberration can be properly corrected, and the satisfactory telecentric properties on the periphery can be easily ensured. In the meantime, when the value of the conditional expression (8) is kept below the upper limit, the overall length of the image pickup lens can be increased without the need of excessively increasing the air clearance of the optical axis third and fourth lenses.

More preferably, the following formula (8)' is met:

$$0.09 < D6/f < 0.23 \quad (8)'$$

The image pickup lens described in claim 12, in the invention described in any one of the claims 1 through 11, is characterized in that the following conditional expression (9) is met:

$$\theta_{EH} < 60° \quad (9)$$

wherein $\theta_{EH}$ denotes the visual angle of the surface at the effective diameter of the fifth lens on the image side.

The conditional expression (9) is intended for proper setting of the visible angle of the surface at the effective diameter of the fifth lens on the image side, and prevention of a ghost from occurring between both surfaces of the fifth lens.

When the value of the conditional expression (9) is kept within this range, it is possible to reduce the angle of reflection formed when the unwanted light reflected on the surface of the fifth lens on the image side is further reflected on the surface of the fifth lens on the object side. This reduces the possibility of a total reflection being realized. It should be pointed out in passing that the effective diameter refers to the height wherein the outermost light of the light flux entering the lens system passes by. The visual angle can be defined as the angle formed by the normal line on the surface of the effective diameter and the optical axis.

The image pickup lens described in claim 13, in the invention described in any one of claims 1 through 12, is characterized in that the following conditional expression (10) is met:

$$0.80 < \Sigma D/f < 1.25 \quad (10)$$

wherein $\Sigma D$ is the distance on the optical axis from the apex of the first lens on the object side to the apex of the fifth lens on the image side, and f is the focal distance of an entire image pickup lens system.

The conditional expression (10) is intended for proper setting of the distance on the optical axis from the apex of the first lens on the object side to the apex of the fifth lens on the image side.

When the value of the conditional expression is above the lower limit of the conditional expression (10), the thicknesses of the lens at the center and edge can be kept at a proper level, and therefore, moldability is not sacrificed. In the meantime, when the value of the conditional expression is below the upper limit of the conditional expression (10), the overall length of the image pickup lens can be reduced.

The image pickup lens described in claim 14, in the invention described in any one of claims 1 through 13, is characterized by being totally made of plastics.

In recent years, for the purpose of achieving downsizing of the entire image pickup apparatus, development has been made of a solid pickup element having a smaller pixel pitch, hence, a smaller size of the image pickup surface, although the number of pixels is the same. The image pickup lens oriented toward such a solid pickup element having a smaller image pickup surface size is required to have a shorter focal distance of the entire system, and therefore, the radius and outer diameter of each lens have to be considerably small. Thus, the low-cost high-volume production of the lens having a smaller radius and outer diameter can be achieved when all the lenses are made of plastic lenses produced by injection molding, as compared with the glass-made lens having to be subjected to the grinding operations that require much time and effort. Further, the plastic lenses allow the temperature at the time of the pressing operation to be reduced. Accordingly, the attrition of the molding die can be minimized, with the result that molding die replacement frequency and maintenance frequency are reduced, whereby cost reduction can be achieved.

The image pickup apparatus described in claim 15 is characterized by comprising a solid pickup element for photoelectric conversion of a subject image and the image pickup lens described in any one of claims 1 through 14. This structure provides a compact high-performance image pickup apparatus.

The portable terminal described in claim 16 is characterized by comprising the image pickup apparatus described in claim 15. This structure provides a compact high-performance portable terminal.

Advantages of the Invention

The present invention provides an image pickup lens of a five-lens structure characterized by various forms of aberrations corrected to a satisfactory level, despite the compact design. This structure, in turn, provides a compact high-performance image pickup apparatus and a portable terminal.

BRIEF DESCRIPTION OF THE DRAWINGS

FIG. 2 is a diagram representing aberrations ((a) spherical aberration, (b) astigmatism, (c) distortion aberration, (d) meridional comatic aberration) of the image pickup lens of Example 1;

FIG. 4 is a diagram representing aberrations ((a) spherical aberration, (b) astigmatism, (c) distortion aberration, (d) meridional comatic aberration) of the image pickup lens of Example 2;

FIG. 6 is a diagram representing aberrations ((a) spherical aberration, (b) astigmatism, (c) distortion aberration, (d) meridional comatic aberration) of the image pickup lens of Example 3;

FIG. 8 is a diagram representing aberrations ((a) spherical aberration, (b) astigmatism, (c) distortion aberration, (d) meridional comatic aberration) of the image pickup lens of Example 4;

FIG. 10 is a diagram representing aberrations ((a) spherical aberration, (b) astigmatism, (c) distortion aberration, (d) meridional comatic aberration) of the image pickup lens of Example 5;

FIG. 12 a diagram representing aberrations ((a) spherical aberration, (b) astigmatism, (c) distortion aberration, (d) meridional comatic aberration) of the image pickup lens of Example 6;

FIG. 14 a diagram representing aberrations ((a) spherical aberration, (b) astigmatism, (c) distortion aberration, (d) meridional comatic aberration) of the image pickup lens of Example 7;

FIG. 16 is a diagram representing aberrations ((a) spherical aberration, (b) astigmatism, (c) distortion aberration, (d) meridional comatic aberration) of the image pickup lens of Example 8;

FIG. 18 is a diagram representing aberrations ((a) spherical aberration, (b) astigmatism, (c) distortion aberration, (d) meridional comatic aberration) of the image pickup lens of Example 9;

FIG. 20 is a diagram representing aberrations ((a) spherical aberration, (b) astigmatism, (c) distortion aberration, (d) meridional comatic aberration) of the image pickup lens of Example 10;

FIG. 22 is a diagram representing aberrations ((a) spherical aberration, (b) astigmatism, (c) distortion aberration, (d) meridional comatic aberration) of the image pickup lens of Example 11;

FIG. 24 is a diagram representing aberrations ((a) spherical aberration, (b) astigmatism, (c) distortion aberration, (d) meridional comatic aberration) of the image pickup lens of Example 12;

DETAILED DESCRIPTION OF THE PREFERRED EMBODIMENTS

Figure 1:
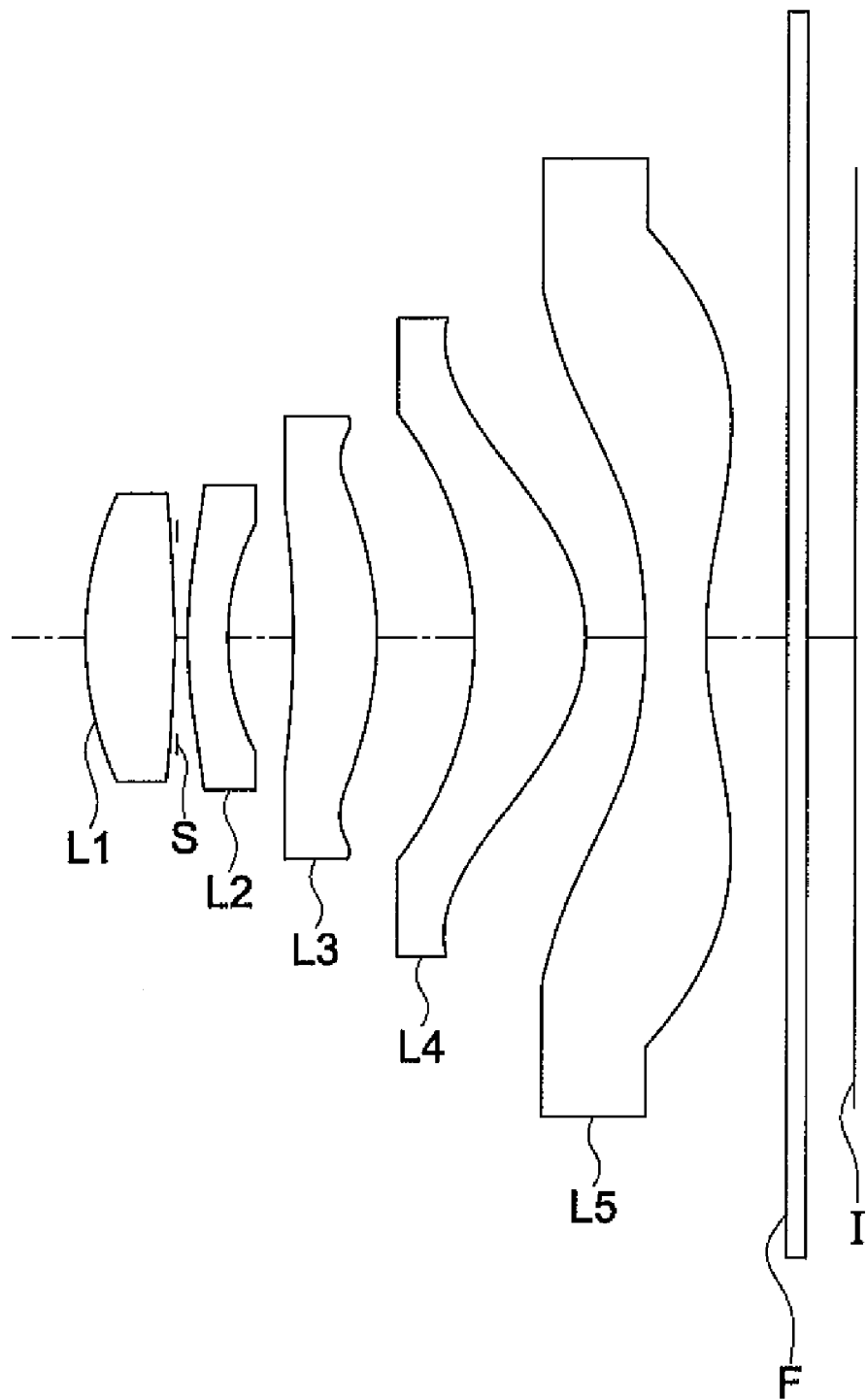
FIG. 1 is a cross sectional view of the image pickup lens of Example 1.

The following describes the Examples of the image pickup lens in the present invention. The reference numerals used in each Example are as shown below:

f: Focal distance of the entire image pickup lens system
fB: Back focus
F: F-number
2Y: Length of diagonal line on image pickup surface of the solid pickup element
ENTP: Entrance pupil position (distance from the first surface to the entrance pupil position)
EXTP: Exit pupil position (distance from image pickup surface to the exit pupil position)
H1: Principal point position on the front side (distance from the first surface to the principal point position on the front side)
H2: Principal point position on the rear side (distance from the final surface to the principal point position on the rear side)
R: Radius
D: On-axis surface spacing
Nd: Refractive index of lens material relative to line d
vd: Abbe's number of the lens material In each of the Examples, the surface with an asterisk (*) marked after each surface number is aspherical.

The aspherical shape is represented by the following Mathematical Formula 1 wherein the apex of the surface is assumed as an origin, the X-axis is assigned in the direction of the optical axis and the height perpendicular to the optical axis is "h".

$$X = \frac{h^2/R}{1+\sqrt{1-(1+K)h^2/R^2}} + \sum A_i h^i \quad \text{[Mathematical Formula 1]}$$

Wherein Ai is an i-th order of an aspherical coefficient, R is a radius and K is a cone constant.

In the following description (including the lens data in Tables), the power multiplier of 10 (e.g., $2.5 \times 10^{-02}$) will be represented using E (e.g., 2.5E-02).

EXAMPLES

Example 1

Table 1 shows the lens data of the image pickup lens in Example 1.

TABLE 1

Example 1
f = 4.67 mm fB = 0.38 mm F = 2.88 2Y = 7.016 mm
ENTP = 0.51 mm EXTP = −2.93 mm H1 = −1.41 mm H2 = −4.29 mm

| Surface no. | R(mm) | D(mm) | Nd | vd | Effective radius (mm) |
|---|---|---|---|---|---|
| 1* | 2.375 | 0.67 | 1.54470 | 56.2 | 1.10 |
| 2* | −8.245 | 0.02 | | | 0.86 |
| 3(Stop) | ∞ | 0.08 | | | 0.74 |
| 4* | 4.001 | 0.30 | 1.63200 | 23.4 | 0.79 |
| 5* | 1.770 | 0.47 | | | 0.87 |
| 6* | −8.425 | 0.63 | 1.54470 | 56.2 | 1.12 |

TABLE 1-continued

Example 1
f = 4.67 mm fB = 0.38 mm F = 2.88 2Y = 7.016 mm
ENTP = 0.51 mm EXTP = −2.93 mm H1 = −1.41 mm H2 = −4.29 mm

| | | | | | |
|---|---|---|---|---|---|
| 7* | −2.908 | 0.74 | | | 1.32 |
| 8* | −2.715 | 0.84 | 1.54470 | 56.2 | 1.68 |
| 9* | −1.194 | 0.45 | | | 1.96 |
| 10* | −2.632 | 0.45 | 1.54470 | 56.2 | 2.62 |
| 11* | 2.488 | 0.60 | | | 3.04 |
| 12 | ∞ | 0.15 | 1.51630 | 64.1 | 4.00 |
| 13 | ∞ | | | | 4.00 |

Aspherical surface coefficient

1st surface

K = −0.24318E+00
A4 = −0.56058E−02
A6 = −0.56184E−02
A8 = 0.21260E−02
A10 = −0.22891E−02
A12 = −0.13903E−02
A14 = 0.29668E−03

2nd surface

K = 0.17174E+02
A4 = 0.13445E−01
A6 = 0.15391E−01
A8 = −0.16152E−01
A10 = −0.21049E−01
A12 = 0.12611E−01
A14 = 0.68234E−02

4th surface

K = −0.29774E+02
A4 = −0.90999E−02
A6 = 0.77557E−01
A8 = −0.94361E−01
A10 = 0.39877E−01
A12 = −0.51393E−02
A14 = −0.12337E−02

5th surface

K = −0.48421E+01
A4 = 0.74789E−02
A6 = 0.68398E−01
A8 = −0.37754E−01
A10 = −0.22152E−01
A12 = 0.34155E−01
A14 = −0.11864E−01

6th surface

K = 0.36188E+00
A4 = −0.25860E−01
A6 = −0.26814E−02
A8 = 0.32573E−01
A10 = 0.51351E−02
A12 = −0.82909E−02
A14 = 0.10275E−02

7th surface

K = 0.14254E+01
A4 = −0.13602E−01
A6 = 0.18886E−01
A8 = −0.10763E−01
A10 = 0.67125E−02
A12 = 0.28948E−02
A14 = −0.12981E−02

8th surface

K = 0.10411E+01
A4 = −0.42652E−01
A6 = 0.33597E−01
A8 = −0.56106E−02
A10 = −0.75233E−03
A12 = 0.57507E−03
A14 = −0.54592E−04

TABLE 1-continued

Example 1
f = 4.67 mm fB = 0.38 mm F = 2.88 2Y = 7.016 mm
ENTP = 0.51 mm EXTP = −2.93 mm H1 = −1.41 mm H2 = −4.29 mm 9th surface K = −0.28942E+01
A4 = −0.66332E−01
A6 = 0.23123E−01
A8 = −0.20391E−02
A10 = 0.15679E−03
A12 = −0.51066E−04
A14 = 0.51489E−05

10th surface

K = −0.13799E+02
A4 = −0.43695E−01
A6 = 0.93678E−02
A8 = −0.17640E−03
A10 = −0.14898E−03
A12 = 0.19571E−04
A14 = −0.80972E−06

11th surface

K = −0.11197E+02
A4 = −0.29864E−01
A6 = 0.44527E−02
A8 = −0.67162E−03
A10 = 0.77252E−04
A12 = −0.58589E−05
A14 = 0.20691E−06

The following shows the single lens data of the image pickup lens in Example 1:

| Lens | Starting surface | Focal distance (mm) |
|---|---|---|
| 1 | 1 | 3.462 |
| 2 | 4 | −5.299 |
| 3 | 6 | 7.837 |
| 4 | 8 | 3.276 |
| 5 | 10 | −2.277 |

FIG. 1 is a cross sectional view of an image pickup lens of Example 1. In FIG. 1, L1 is a first lens, L2 is a second lens, L3 is a third lens, L4 is a fourth lens, L5 is a fifth lens, S is an aperture stop, and I is an image pickup surface. F indicates a parallel flat plate wherein an optical low pass filter, IR cut filter, seal glass of the solid pickup element and others are assumed. In Example 1, an aperture stop S is arranged between the first lens L1 and second lens L2.

FIG. 2 is a diagram representing aberrations ((a) spherical aberration, (b) astigmatism, (c) distortion aberration, (d) meridional comatic aberration) of the image pickup lens of Example 1. In the astigmatism diagram, the solid line indicates a sagittal image surface (S) and the broken line denotes a meridional image surface (M).

In Example 1, all the lenses are formed of plastics. For example, when the focal point position is adjusted in the auto-focusing and macro switchover functions, the partial feed-out operation is preferably performed, wherein the first lens L1 through third lens L3 are moved as an integral device.

Example 2

Table 2 shows the lens data of the image pickup lens in Example 2.

TABLE 2

Example 2
f = 4.67 mm fB = 0.32 mm F = 2.8 2Y = 7.016 mm
ENTP = 0.52 mm EXTP = −2.97 mm H1 = −1.43 mm H2 = −4.35 mm

| Surface no. | R(mm) | D(mm) | Nd | νd | Effective radius (mm) |
|---|---|---|---|---|---|
| 1* | 2.308 | 0.70 | 1.58910 | 61.1 | 1.11 |
| 2* | −11.951 | 0.02 | | | 0.84 |
| 3(Stop) | ∞ | 0.08 | | | 0.75 |
| 4* | 4.920 | 0.30 | 1.63200 | 23.4 | 0.79 |
| 5* | 1.815 | 0.43 | | | 0.88 |
| 6* | −24.407 | 0.63 | 1.54470 | 56.2 | 1.15 |
| 7* | −3.594 | 0.79 | | | 1.35 |
| 8* | −2.517 | 0.77 | 1.54470 | 56.2 | 1.67 |
| 9* | −1.076 | 0.35 | | | 1.93 |
| 10* | −3.161 | 0.45 | 1.54470 | 56.2 | 2.65 |
| 11* | 1.907 | 0.60 | | | 3.02 |
| 12 | ∞ | 0.30 | 1.51630 | 64.1 | 3.50 |
| 13 | ∞ | | | | 3.58 |

Aspherical surface coefficient

1st surface

K = −0.62632E−01
A4 = −0.39018E−02
A6 = −0.48221E−03
A8 = −0.71011E−03
A10 = −0.14998E−02
A12 = 0.16959E−02
A14 = −0.84399E−03

2nd surface

K = −0.25860E+01
A4 = 0.16642E−01
A6 = 0.77595E−02
A8 = −0.10828E−01
A10 = −0.13363E−02
A12 = −0.46903E−02
A14 = 0.67359E−02

4th surface

K = −0.29412E+02
A4 = −0.28091E−01
A6 = 0.86259E−01
A8 = −0.92886E−01
A10 = 0.42703E−01
A12 = −0.80428E−02
A14 = −0.12253E−02

5th surface

K = −0.44142E+01
A4 = 0.23997E−02
A6 = 0.63071E−01
A8 = −0.30219E−01
A10 = −0.27603E−01
A12 = 0.37731E−01
A14 = −0.13001E−01

6th surface

K = 0.30000E+02
A4 = −0.15702E−01
A6 = −0.16299E−02
A8 = 0.22122E−01
A10 = 0.12069E−02
A12 = −0.65893E−02
A14 = 0.17219E−02

7th surface

K = 0.15293E+01
A4 = −0.11249E−01
A6 = 0.16239E−01
A8 = −0.12724E−01

TABLE 2-continued

Example 2
f = 4.67 mm fB = 0.32 mm F = 2.8 2Y = 7.016 mm
ENTP = 0.52 mm EXTP = −2.97 mm H1 = −1.43 mm H2 = −4.35 mm

A10 = 0.54559E−02
A12 = 0.24654E−02
A14 = −0.10792E−02

8th surface

K = 0.71998E+00
A4 = −0.37910E−01
A6 = 0.31958E−01
A8 = −0.59080E−02
A10 = −0.73305E−03
A12 = 0.62752E−03
A14 = −0.59041E−04

9th surface

K = −0.30283E+01
A4 = −0.72689E−01
A6 = 0.25333E−01
A8 = −0.19462E−02
A10 = 0.16036E−03
A12 = −0.52541E−04
A14 = 0.43077E−05

10th surface

K = −0.23947E+02
A4 = −0.48192E−01
A6 = 0.94742E−02
A8 = −0.11536E−03
A10 = −0.14419E−03
A12 = 0.18927E−04
A14 = −0.84812E−06

11th surface

K = −0.11383E+02
A4 = −0.31216E−01
A6 = 0.43667E−02
A8 = −0.65783E−03
A10 = 0.76503E−04
A12 = −0.61097E−05
A14 = 0.23789E−06

The following shows the single lens data of the image pickup lens in Example 2:

| Lens | Starting surface | Focal distance (mm) |
|---|---|---|
| 1 | 1 | 3.345 |
| 2 | 4 | −4.727 |
| 3 | 6 | 7.656 |
| 4 | 8 | 2.903 |
| 5 | 10 | −2.117 |

Figure 3:
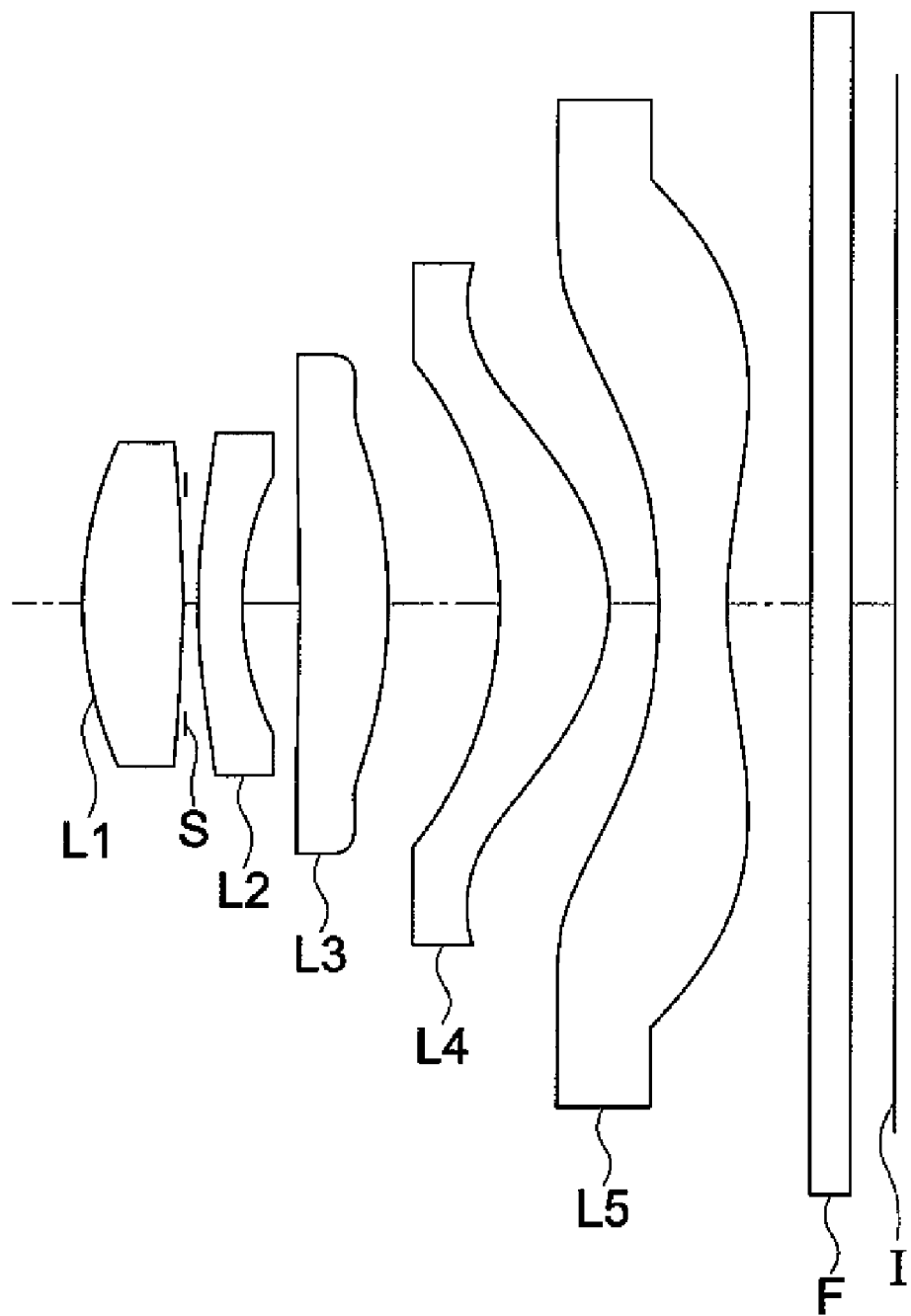
FIG. 3 is a cross sectional view of the image pickup lens of Example 2.

FIG. 3 is a cross sectional view of an image pickup lens of Example 2. In FIG. 3, L1 is a first lens, L2 is a second lens, L3 is a third lens, L4 is a fourth lens, L5 is a fifth lens, S is an aperture stop, and I is an image pickup surface. F indicates a parallel flat plate wherein an optical low pass filter, IR cut filter, seal glass of the solid pickup element and others are assumed. In Example 2, an aperture stop S is arranged between the first lens L1 and second lens L2.

FIG. 4 is a diagram representing aberrations ((a) spherical aberration, (b) astigmatism, (c) distortion aberration, (d) meridional comatic aberration) of the image pickup lens of Example 2. In the astigmatism diagram, the solid line indicates a sagittal image surface (S) and the broken line denotes a meridional image surface (M).

In Example 2, the first lens L1 is a glass-molded lens, and the other lenses are made of plastics. For example, when the focal point position is adjusted in the auto-focusing and macro switchover functions, the partial feed-out operation is preferably performed, wherein the first lens L1 through third lens L3 are moved as an integral device.

Example 3

Table 3 shows the lens data of the image pickup leas in Example 3.

TABLE 3

Example 3
f = 4.68 mm fB = 0.39 mm F = 2.8 2Y = 7.016 mm
ENTP = 0.52 mm EXTP = −2.91 mm H1 = −1.44 mm H2 = −4.29 mm

| Surface no. | R(mm) | D(mm) | Nd | νd | Effective radius (mm) |
|---|---|---|---|---|---|
| 1* | 2.516 | 0.69 | 1.54470 | 56.2 | 1.18 |
| 2* | −5.286 | 0.02 | | | 0.99 |
| 3(Stop) | ∞ | 0.08 | | | 0.76 |
| 4* | 4.410 | 0.30 | 1.58300 | 30.0 | 0.89 |
| 5* | 1.469 | 0.39 | | | 0.98 |
| 6* | 23.016 | 0.64 | 1.54470 | 56.2 | 1.16 |
| 7* | −4.126 | 0.94 | | | 1.32 |
| 8* | −2.957 | 0.74 | 1.54470 | 56.2 | 1.72 |
| 9* | −1.007 | 0.23 | | | 2.10 |
| 10* | −3.287 | 0.45 | 1.54470 | 56.2 | 2.87 |
| 11* | 1.520 | 0.60 | | | 3.10 |
| 12 | ∞ | 0.30 | 1.51630 | 64.1 | 3.68 |
| 13 | ∞ | | | | 3.77 |

Aspherical surface coefficient

1st surface

K = −0.71150E−01
A4 = −0.46007E−02
A6 = −0.41218E−02
A8 = 0.88391E−03
A10 = −0.16344E−02
A12 = −0.47327E−04
A14 = −0.58101E−03

2nd surface

K = −0.29115E+02
A4 = 0.28153E−01
A6 = −0.14215E−01
A8 = −0.10428E−01
A10 = 0.45911E−02
A12 = −0.59555E−02
A14 = 0.56969E−02

4th surface

K = −0.30000E+02
A4 = −0.55026E−01
A6 = 0.10399E+00
A8 = −0.11223E+00
A10 = 0.33795E−01
A12 = 0.41129E−02
A14 = −0.20059E−02

5th surface

K = −0.51482E+01
A4 = −0.42034E−02
A6 = 0.62173E−01
A8 = −0.35270E−01
A10 = −0.31760E−01
A12 = 0.29784E−01
A14 = −0.45535E−02

6th surface

K = −0.22265E+02
A4 = −0.94272E−02
A6 = 0.71199E−02
A8 = 0.25362E−01
A10 = −0.22888E−02
A12 = −0.96355E−02
A14 = 0.26489E−02

TABLE 3-continued

Example 3
f = 4.68 mm fB = 0.39 mm F = 2.8 2Y = 7.016 mm
ENTP = 0.52 mm EXTP = −2.91 mm H1 = −1.44 mm H2 = −4.29 mm 7th surface K = 0.70378E+00
A4 = −0.11503E−01
A6 = 0.16171E−01
A8 = −0.12670E−01
A10 = 0.78508E−02
A12 = 0.33682E−02
A14 = −0.19434E−02

8th surface

K = 0.16560E+01
A4 = −0.34291E−01
A6 = 0.29011E−01
A8 = −0.52159E−02
A10 = −0.96799E−03
A12 = 0.58681E−03
A14 = −0.72822E−04

9th surface

K = −0.34863E+01
A4 = −0.66301E−01
A6 = 0.29294E−01
A8 = −0.26655E−02
A10 = −0.81259E−04
A12 = −0.73019E−04
A14 = 0.13750E−04

10th surface

K = −0.27947E+02
A4 = −0.45043E−01
A6 = 0.94049E−02
A8 = −0.14063E−03
A10 = −0.15129E−03
A12 = 0.18785E−04
A14 = −0.72482E−06

11th surface

K = −0.10469E+02
A4 = −0.33909E−01
A6 = 0.52179E−02
A8 = −0.73376E−03
A10 = 0.71966E−04
A12 = −0.60982E−05
A14 = 0.29480E−06

The following shows the single lens data of the image pickup lens in Example 3:

| Lens | Starting surface | Focal distance (mm) |
|---|---|---|
| 1 | 1 | 3.230 |
| 2 | 4 | −3.927 |
| 3 | 6 | 6.476 |
| 4 | 8 | 2.472 |
| 5 | 10 | −1.847 |

Figure 5:
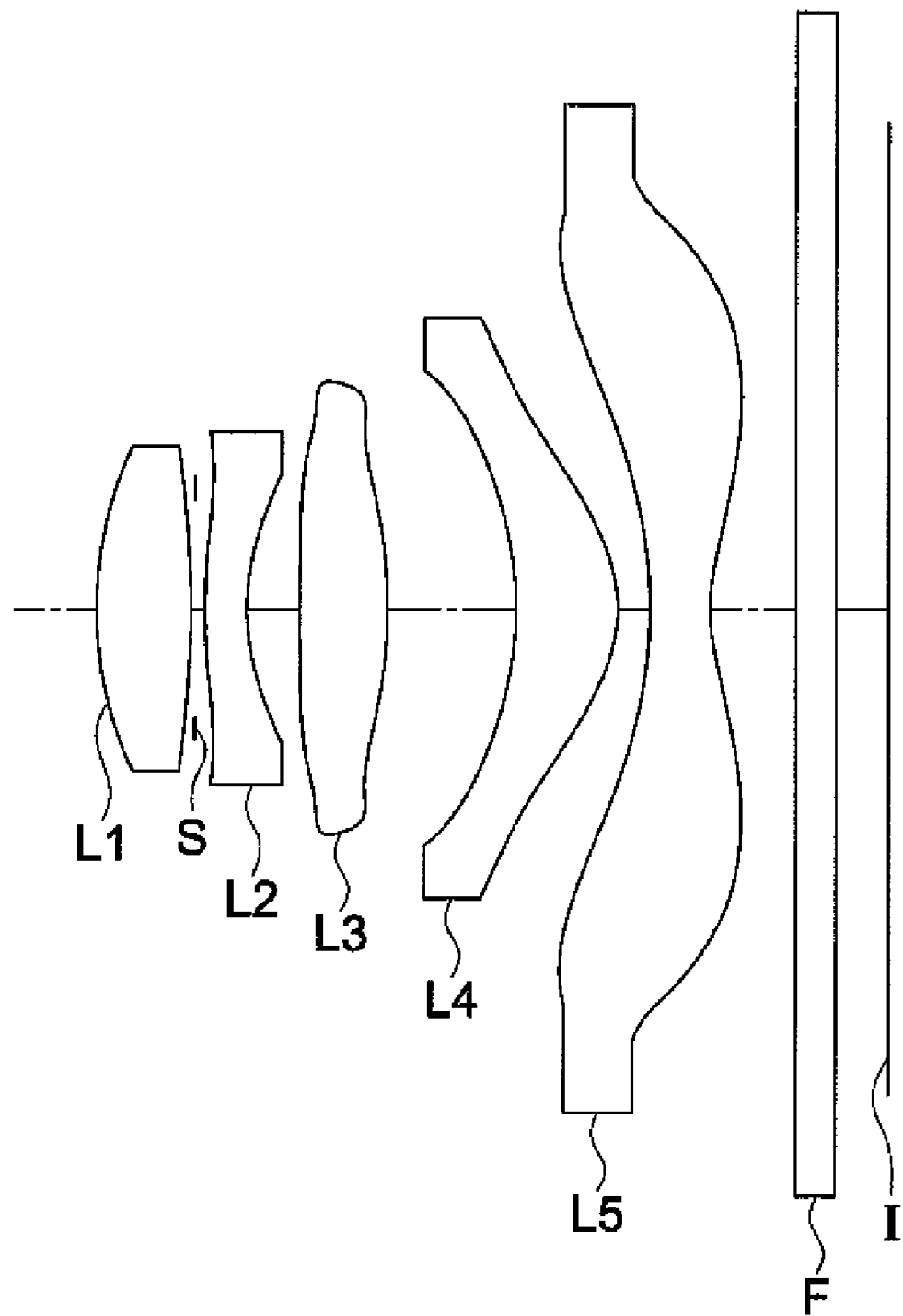
FIG. 5 is a cross sectional view of the image pickup lens of Example 3.

FIG. 5 is a cross sectional view of an image pickup lens of Example 3. In FIG. 5, L1 is a first lens, L2 is a second lens, L3 is a third lens, L4 is a fourth lens, L5 is a fifth lens, S is an aperture stop, and I is an image pickup surface. F indicates a parallel flat plate wherein an optical low pass filter, IR cut filter, seal glass of the solid pickup element and others are assumed. In Example 3, an aperture stop S is arranged between the first lens L1 and second lens L2.

FIG. 6 is a diagram representing aberrations ((a) spherical aberration, (b) astigmatism, (c) distortion aberration, (d) meridional comatic aberration) of the image pickup lens of Example 3. In the astigmatism diagram, the solid line indicates a sagittal image surface (S) and the broken line denotes a meridional image surface (M).

In Example 3, all the lenses are formed of plastics. For example, when the focal point position is adjusted in the auto-focusing and macro switchover functions, the partial feed-out operation is preferably performed, wherein the first lens L1 through third lens L3 are moved as an integral device.

Example 4

Table 4 shows the lens data of the image pickup lens in Example 4.

TABLE 4

Example 4
f = 4.67 mm fB = 0.24 mm F = 2.8 2Y = 7.016 mm
ENTP = 0.56 mm EXTP = −2.82 mm H1 = −1.89 mm H2 = −4.43 mm

| Surface no. | R(mm) | D(mm) | Nd | vd | Effective radius (mm) |
|---|---|---|---|---|---|
| 1* | 2.307 | 0.73 | 1.54470 | 56.2 | 1.14 |
| 2* | −9.357 | 0.02 | | | 0.87 |
| 3(Stop) | ∞ | 0.08 | | | 0.75 |
| 4* | 7.294 | 0.30 | 1.63200 | 23.4 | 0.78 |
| 5* | 2.228 | 0.44 | | | 0.88 |
| 6* | −10.317 | 0.66 | 1.54470 | 56.2 | 1.12 |
| 7* | −2.826 | 0.80 | | | 1.32 |
| 8* | −2.683 | 0.74 | 1.54470 | 56.2 | 1.72 |
| 9* | −1.172 | 0.42 | | | 1.95 |
| 10* | −2.770 | 0.45 | 1.54470 | 56.2 | 2.55 |
| 11* | 1.979 | 0.60 | | | 3.07 |
| 12 | ∞ | 0.30 | 1.51630 | 64.1 | 3.43 |
| 13 | ∞ | | | | 3.52 |

Aspherical surface coefficient

1st surface

K = −0.15209E+00
A4 = −0.48175E−02
A6 = −0.26065E−02
A8 = 0.23923E−03
A10 = −0.15919E−02
A12 = 0.71834E−04
A14 = −0.57305E−03

2nd surface

K = 0.17961E+02
A4 = 0.13915E−01
A6 = 0.10184E−01
A8 = −0.16765E−01
A10 = −0.10758E−01
A12 = 0.42172E−02
A14 = 0.68234E−02

4th surface

K = −0.30000E+02
A4 = −0.25687E−01
A6 = 0.76762E−01
A8 = −0.95516E−01
A10 = 0.40852E−01
A12 = −0.48258E−02
A14 = −0.12337E−02

5th surface

K = −0.46268E+01
A4 = 0.16839E−02
A6 = 0.59628E−01
A8 = −0.32659E−01
A10 = −0.23977E−01
A12 = 0.32993E−01
A14 = −0.10082E−01

6th surface

K = −0.11219E+02
A4 = −0.22500E−01
A6 = −0.21090E−02

TABLE 4-continued

Example 4
f = 4.67 mm fB = 0.24 mm F = 2.8 2Y = 7.016 mm
ENTP = 0.56 mm EXTP = −2.82 mm H1 = −1.89 mm H2 = −4.43 mm

A8 = 0.25499E−01
A10 = 0.22413E−02
A12 = −0.72524E−02
A14 = 0.16116E−02

7th surface

K = 0.14582E+01
A4 = −0.11919E−01
A6 = 0.17948E−01
A8 = −0.12272E−01
A10 = 0.59643E−02
A12 = 0.27477E−02
A14 = −0.11255E−02

8th surface

K = 0.92899E+00
A4 = −0.40677E−01
A6 = 0.33386E−01
A8 = −0.55615E−02
A10 = −0.62541E−03
A12 = 0.60607E−03
A14 = −0.73078E−04

9th surface

K = −0.31410E+01
A4 = −0.67353E−01
A6 = 0.24509E−01
A8 = −0.19351E−02
A10 = 0.16493E−03
A12 = −0.51839E−04
A14 = 0.43572E−05

10th surface

K = −0.15117E+02
A4 = −0.46200E−01
A6 = 0.94704E−02
A8 = −0.13069E−03
A10 = −0.14536E−03
A12 = 0.19443E−04
A14 = −0.85925E−06

11th surface

K = −0.11050E+02
A4 = −0.25482E−01
A6 = 0.43779E−02
A8 = −0.66939E−03
A10 = 0.76985E−04
A12 = −0.60010E−05
A14 = 0.21625E−06

The following shows the single lens data of the image pickup lens in Example 4:

| Lens | Starting surface | Focal distance (mm) |
|---|---|---|
| 1 | 1 | 3.475 |
| 2 | 4 | −5.194 |
| 3 | 6 | 6.931 |
| 4 | 8 | 3.258 |
| 5 | 10 | −2.051 |

Figure 7:
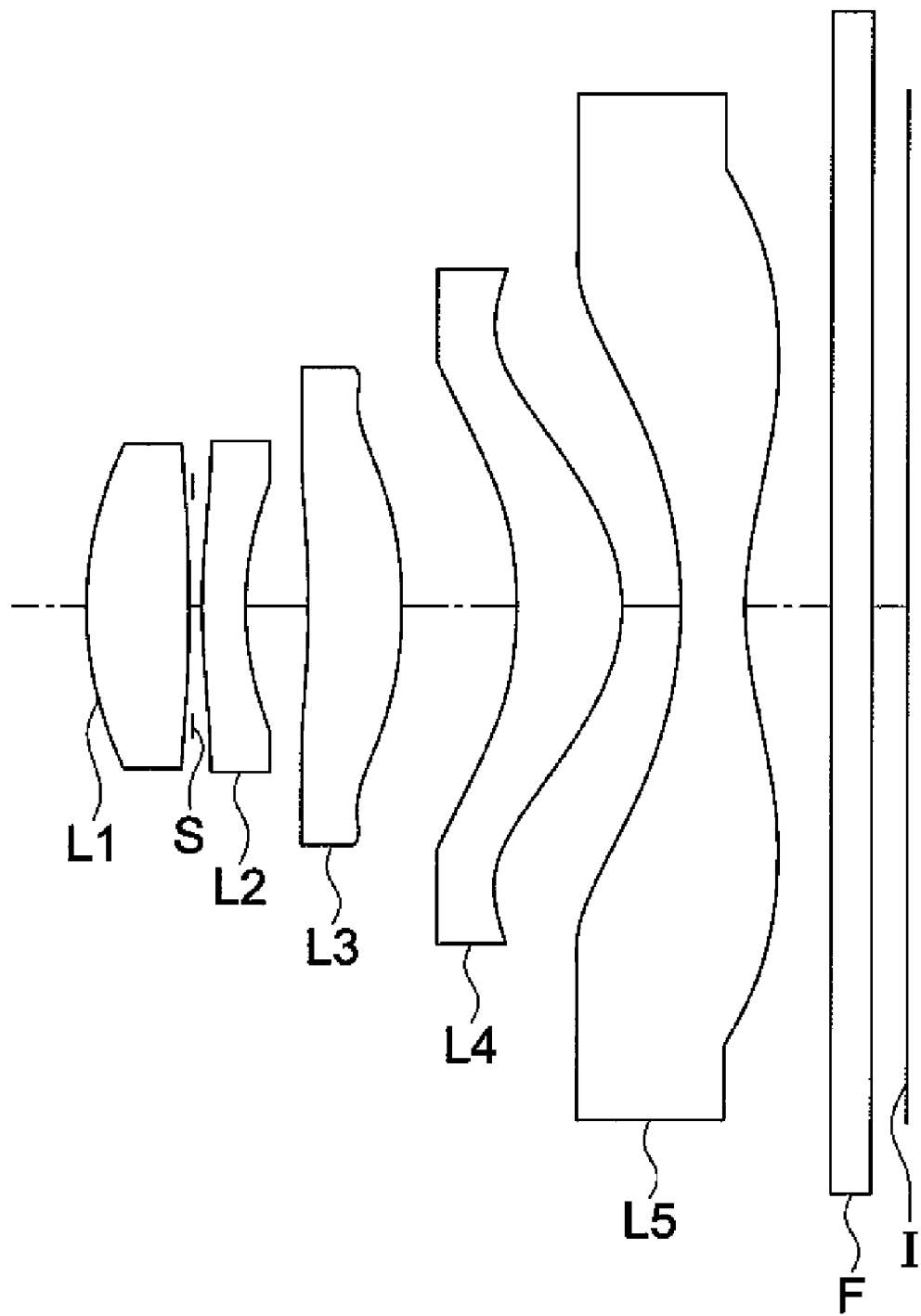
FIG. 7 is a cross sectional view of the image pickup lens of Example 4.

FIG. 7 is a cross sectional view of an image pickup lens of Example 4. In FIG. 7, L1 is a first lens, L2 is a second lens, L3 is a third lens, L4 is a fourth lens, L5 is a fifth lens, S is an aperture stop, and I is an image pickup surface. F indicates a parallel flat plate wherein an optical low pass filter, IR cut filter, seal glass of the solid pickup element and others are assumed. In Example 4, an aperture stop S is arranged between the first lens L1 and second lens L2.

FIG. 8 is a diagram representing aberrations ((a) spherical aberration, (b) astigmatism, (c) distortion aberration, (d)

meridional comatic aberration) of the image pickup lens of Example 4. In the astigmatism diagram, the solid line indicates a sagittal image surface (S) and the broken line denotes a meridional image surface (M).

In Example 4, all the lenses are formed of plastics. For example, when the focal point position is adjusted in the auto-focusing and macro switchover functions, the partial feed-out operation is preferably performed, wherein the first lens L1 through third lens L3 are moved as an integral device.

Example 5

Table 5 shows the lens data of the image pickup lens in Example 5.

TABLE 5

Example 5
f = 4.67 mm fB = 0.3 mm F = 2.8 2Y = 7.016 mm
ENTP = 0.58 mm EXTP = −2.99 mm H1 = −1.37 mm H2 = −4.37 mm

| Surface no. | R(mm) | D(mm) | Nd | νd | Effective radius (mm) |
|---|---|---|---|---|---|
| 1* | 2.139 | 0.76 | 1.54470 | 56.2 | 1.16 |
| 2* | −12.527 | 0.02 | | | 0.92 |
| 3(Stop) | ∞ | 0.07 | | | 0.74 |
| 4* | 4.518 | 0.30 | 1.63200 | 23.4 | 0.87 |
| 5* | 1.883 | 0.47 | | | 0.93 |
| 6* | −6.771 | 0.68 | 1.54470 | 56.2 | 1.13 |
| 7* | −2.477 | 0.77 | | | 1.34 |
| 8* | −2.205 | 0.82 | 1.54470 | 56.2 | 1.66 |
| 9* | −0.949 | 0.27 | | | 1.97 |
| 10* | −2.190 | 0.45 | 1.54470 | 56.2 | 2.74 |
| 11* | 1.926 | 0.60 | | | 3.05 |
| 12 | ∞ | 0.30 | 1.51630 | 64.1 | 3.46 |
| 13 | ∞ | | | | 3.54 |

Aspherical surface coefficient

1st surface

K = 0.26558E−01
A4 = −0.18851E−02
A6 = −0.22712E−02
A8 = 0.12727E−02
A10 = −0.21871E−02
A12 = 0.15882E−02
A14 = −0.16112E−02

2nd surface

K = −0.30000E+02
A4 = 0.19494E−01
A6 = −0.23496E−03
A8 = −0.15827E−01
A10 = 0.25757E−02
A12 = −0.93408E−02
A14 = 0.68234E−02

4th surface

K = −0.17606E+02
A4 = −0.20001E−01
A6 = 0.65196E−01
A8 = −0.89833E−01
A10 = 0.39380E−01
A12 = −0.89967E−02
A14 = −0.12346E−02

5th surface

K = −0.38810E+01
A4 = 0.40167E−02
A6 = 0.60314E−01
A8 = −0.28396E−01
A10 = −0.24073E−01
A12 = 0.33881E−01
A14 = −0.12265E−01

TABLE 5-continued

Example 5
f = 4.67 mm fB = 0.3 mm F = 2.8 2Y = 7.016 mm
ENTP = 0.58 mm EXTP = −2.99 mm H1 = −1.37 mm H2 = −4.37 mm 6th surface K = 0.91345E+01
A4 = −0.27556E−01
A6 = −0.56137E−02
A8 = 0.26908E−01
A10 = 0.63675E−02
A12 = 0.21773E−03
A14 = −0.24628E−02

7th surface

K = 0.13642E+01
A4 = −0.13834E−01
A6 = 0.20066E−01
A8 = −0.14488E−01
A10 = 0.75606E−02
A12 = 0.29344E−02
A14 = −0.90504E−03

8th surface

K = 0.41709E+00
A4 = −0.64055E−01
A6 = 0.43892E−01
A8 = −0.59102E−02
A10 = −0.11128E−02
A12 = 0.69986E−03
A14 = −0.59521E−04

9th surface

K = −0.30172E+01
A4 = −0.91767E−01
A6 = 0.30634E−01
A8 = −0.18830E−02
A10 = 0.61341E−04
A12 = −0.77714E−04
A14 = 0.77149E−05

10th surface

K = −0.15996E+02
A4 = −0.44294E−01
A6 = 0.98072E−02
A8 = −0.98973E−04
A10 = −0.15586E−03
A12 = 0.17085E−04
A14 = −0.57279E−06

11th surface

K = −0.12494E+02
A4 = −0.30230E−01
A6 = 0.45170E−02
A8 = −0.71060E−03
A10 = 0.85375E−04
A12 = −0.64141E−05
A14 = 0.23016E−06

The following shows the single lens data of the image pickup lens in Example 5;

| Lens | Starting surface | Focal distance (mm) |
|---|---|---|
| 1 | 1 | 3.416 |
| 2 | 4 | −5.344 |
| 3 | 6 | 6.792 |
| 4 | 8 | 2.485 |
| 5 | 10 | −1.812 |

Figure 9:
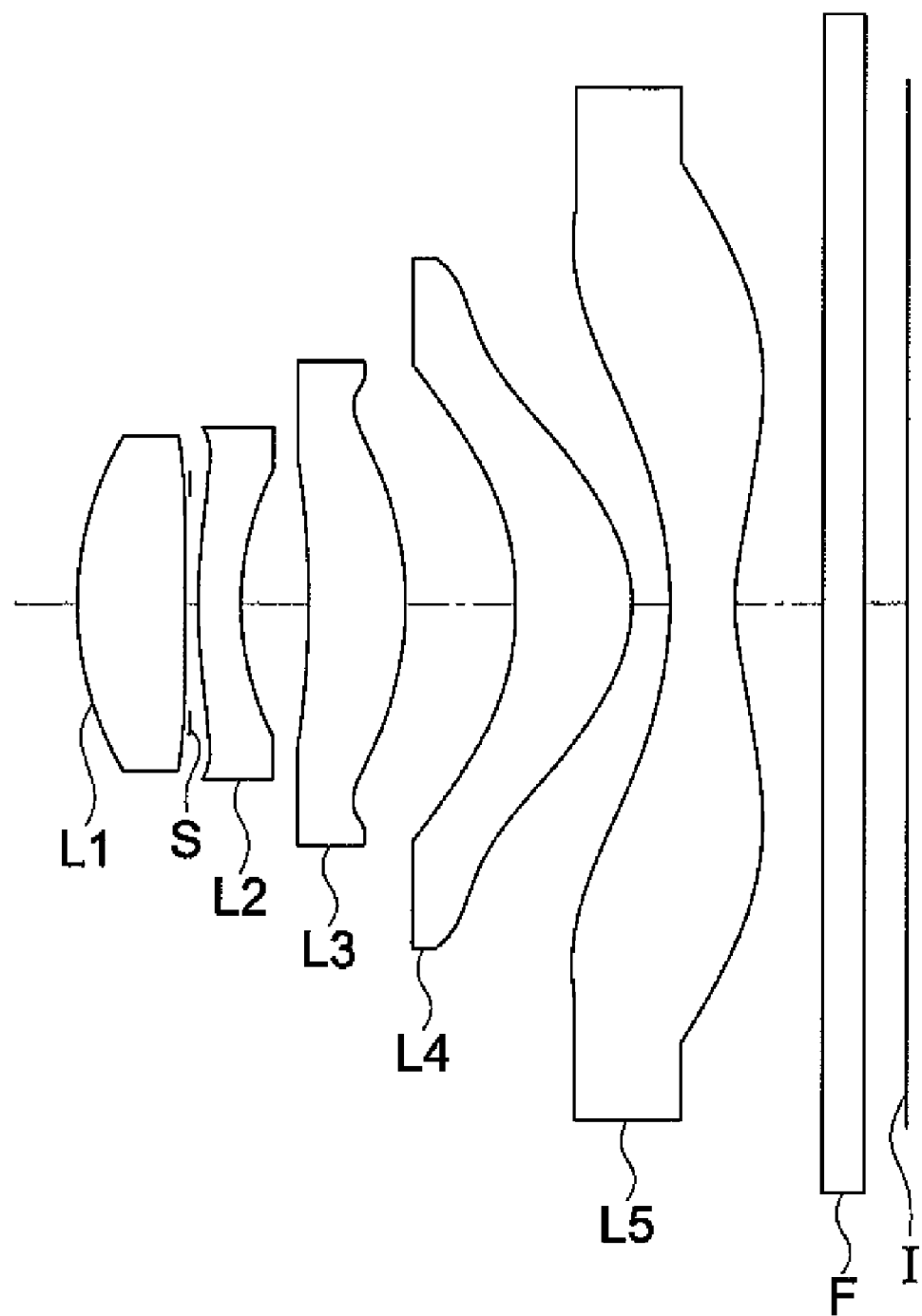
FIG. 9 is a cross sectional view of the image pickup lens of Example 5.

FIG. 9 is a cross sectional view of an image pickup lens of Example 5. In FIG. 9, L1 is a first lens, L2 is a second lens, L3 is a third lens, L4 is a fourth lens, L5 is a fifth lens, S is an aperture stop, and I is an image pickup surface. F indicates a parallel flat plate wherein an optical low pass filter, IR cut filter, seal glass of the solid pickup element and others are assumed. In Example 5, an aperture stop S is arranged between the first lens L1 and second lens L2.

FIG. 10 is a diagram representing aberrations ((a) spherical aberration, (b) astigmatism, (c) distortion aberration, (d) meridional comatic aberration) of the image pickup lens of Example 5. In the astigmatism diagram, the solid line indicates a sagittal image surface (S) and the broken line denotes a meridional image surface (M).

In Example 5, all the lenses are formed of plastics. For example, when the focal point position is adjusted in the auto-focusing and macro switchover functions, the partial feed-out operation is preferably performed, wherein the first lens L1 through third lens L3 are moved as an integral device.

Example 6

Table 6 shows the lens data of the image pickup lens in Example 6.

TABLE 6

Example 6 f = 4.05 mm fB = 0.22 mm F = 2.88 2Y = 5.712 mm
ENTP = 0.4 mm EXTP = −2.36 mm
H1 = −1.92 mm H2 = −3.83 mm

| Surface no. | R (mm) | D (mm) | Nd | vd | Effective radius (mm) |
|---|---|---|---|---|---|
| 1* | 1.717 | 0.54 | 1.54470 | 56.2 | 0.87 |
| 2* | −14.324 | 0.00 | | | 0.68 |
| 3 (Stop) | ∞ | 0.10 | | | 0.64 |
| 4* | 5.021 | 0.30 | 1.63200 | 23.4 | 0.68 |
| 5* | 1.844 | 0.45 | | | 0.75 |
| 6* | −6.014 | 0.60 | 1.54470 | 56.2 | 0.95 |
| 7* | −2.097 | 0.64 | | | 1.11 |
| 8* | −2.003 | 0.40 | 1.54470 | 56.2 | 1.36 |
| 9* | −1.315 | 0.31 | | | 1.64 |
| 10* | −4.351 | 0.40 | 1.54470 | 56.2 | 2.20 |
| 11* | 1.974 | 0.42 | | | 2.42 |
| 12 | ∞ | 0.30 | 1.51630 | 64.1 | 2.79 |
| 13 | ∞ | | | | 2.87 |

Aspherical surface coefficient

1st surface $\kappa$ = −0.31031E+00
A4 = −0.17570E−02
A6 = −0.88644E−04
A8 = −0.33390E−01
A10 = 0.78540E−01
A12 = −0.80607E−01
A14 = 0.29147E−01

2nd surface $\kappa$ = 0.67689E+02
A4 = −0.30957E−01
A6 = 0.19874E+00
A8 = −0.47345E+00
A10 = 0.68892E+00
A12 = −0.48622E+00
A14 = 0.63828E−01

4th surface $\kappa$ = 0.20910E+02
A4 = −0.10527E+00
A6 = 0.26792E+00
A8 = −0.46556E+00
A10 = 0.56676E+00
A12 = −0.34024E+00
A14 = −0.76059E−01

TABLE 6-continued

Example 6

5th surface $\kappa$ = −0.37571E+01
A4 = −0.18682E−02
A6 = 0.16182E+00
A8 = −0.75362E−01
A10 = −0.70667E−01
A12 = 0.23774E+00
A14 = −0.20455E+00

6th surface $\kappa$ = 0.33836E+02
A4 = −0.63563E−01
A6 = −0.14105E−01
A8 = 0.64491E−01
A10 = 0.71783E−01
A12 = 0.57621E−01
A14 = −0.57137E−01

7th surface $\kappa$ = 0.21800E+01
A4 = −0.59036E−01
A6 = 0.32006E−01
A8 = 0.13399E−01
A10 = −0.11381E−01
A12 = 0.31584E−01
A14 = 0.70063E−02

8th surface $\kappa$ = −0.23670E+00
A4 = −0.21449E+00
A6 = 0.12750E+00
A8 = −0.19033E−01
A10 = −0.28842E−02
A12 = 0.46219E−02
A14 = −0.15358E−02

9th surface $\kappa$ = −0.36222E+01
A4 = −0.17079E+00
A6 = 0.95727E−01
A8 = −0.64161E−02
A10 = −0.23542E−02
A12 = −0.27545E−03
A14 = 0.10094E−03

10th surface $\kappa$ = 0.24559E+01
A4 = −0.68837E−01
A6 = 0.22485E−01
A8 = 0.13183E−02
A10 = −0.63730E−03
A12 = −0.25535E−04
A14 = 0.11138E−04

11th surface $\kappa$ = −0.10700E+02
A4 = −0.68114E−01
A6 = 0.14946E−01
A8 = −0.36599E−02
A10 = 0.69156E−03
A12 = −0.77189E−04
A14 = 0.40004E−05

The following shows the single lens data of the image pickup lens in Example 6:

| Lens | Starting surface | Focal distance (mm) |
|---|---|---|
| 1 | 1 | 2.849 |
| 2 | 4 | −4.787 |
| 3 | 6 | 5.609 |
| 4 | 8 | 5.829 |
| 5 | 10 | −2.439 |

Figure 11:
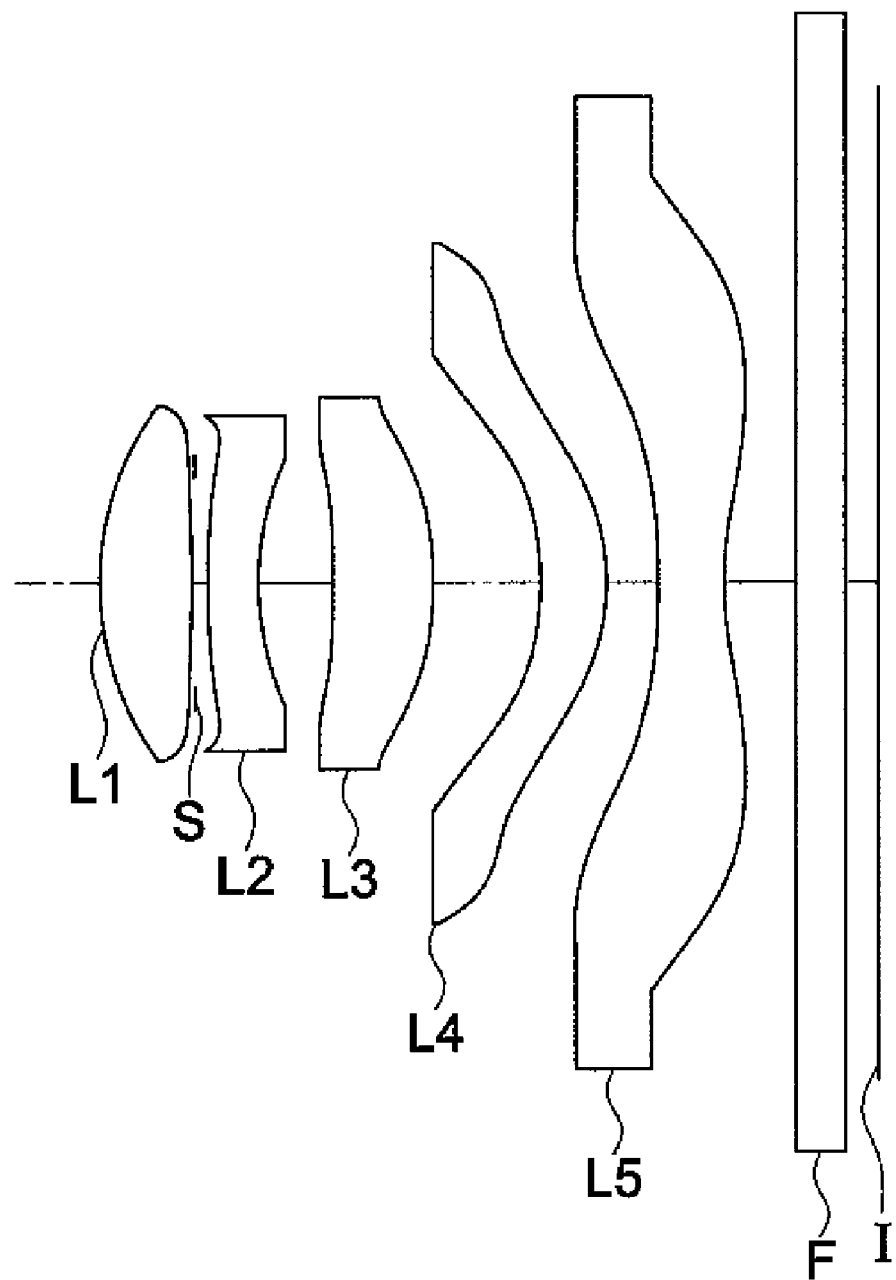
FIG. 11 is a cross sectional view of the image pickup lens of Example 6.

FIG. 11 is a cross sectional view of an image pickup lens of Example 6. In FIG. 11, L1 is a first lens, L2 is a second lens, L3 is a third lens, L4 is a fourth lens, L5 is a fifth lens, S is an aperture stop, and I is an image pickup surface. F indicates a parallel flat plate wherein an optical low pass filter, IR cut filter, seal glass of the solid pickup element and others are assumed. In Example 6, an aperture stop S is arranged between the first lens L1 and second lens L2.

FIG. 12 is a diagram representing aberrations ((a) spherical aberration, (b) astigmatism, (c) distortion aberration, (d) meridional comatic aberration) of the image pickup lens of Example 6. In the astigmatism diagram, the solid line indicates a sagittal image surface (S) and the broken line denotes a meridional image surface (M).

In Example 6, all the lenses are formed of plastics. For example, when the focal point position is adjusted in the auto-focusing and macro switchover functions, the partial feed-out operation is preferably performed, wherein the first lens L1 through third lens L3 are moved as an integral device.

Example 7

Table 7 shows the lens data of the image pickup lens in Example 7.

TABLE 7

Example 7 f = 4.67 mm fB = 0.55 mm F = 2.8 2Y = 7.016 mm
ENTP = 0.43 mm EXTP = −3.65 mm
H1 = −0.1 mm H2 = −4.12 mm

| Surface no. | R (mm) | D (mm) | Nd | νd | Effective radius (mm) |
|---|---|---|---|---|---|
| 1* | 17.577 | 0.62 | 1.54470 | 56.2 | 1.30 |
| 2* | −2.486 | 0.02 | | | 1.19 |
| 3 (Stop) | ∞ | 0.28 | | | 0.82 |
| 4* | 2.672 | 0.30 | 1.63200 | 23.4 | 1.03 |
| 5* | 1.306 | 0.34 | | | 1.10 |
| 6* | 5.982 | 0.74 | 1.54470 | 56.2 | 1.33 |
| 7* | −4.884 | 1.02 | | | 1.40 |
| 8* | −2.538 | 1.06 | 1.54470 | 56.2 | 1.66 |
| 9* | −0.875 | 0.15 | | | 2.07 |
| 10* | −4.450 | 0.45 | 1.54470 | 56.2 | 2.83 |
| 11* | 1.280 | 0.60 | | | 3.10 |
| 12 | ∞ | 0.30 | 1.51630 | 64.1 | 3.41 |
| 13 | ∞ | | | | 3.48 |

Aspherical surface coefficient

1st surface

κ = −0.19820E+02
A4 = −0.31928E−01
A6 = −0.13566E−02
A8 = −0.61486E−03
A10 = −0.15474E−02
A12 = 0.16427E−02
A14 = −0.65407E−03

2nd surface

κ = −0.83730E+01
A4 = −0.84904E−02
A6 = −0.13248E−01
A8 = −0.13213E−02
A10 = 0.12693E−01
A12 = −0.11197E−01
A14 = 0.29352E−02

4th surface

κ = −0.94918E+01
A4 = −0.40508E−02
A6 = 0.70847E−01
A8 = −0.10420E+00
A10 = 0.74339E−01

TABLE 7-continued

Example 7

A12 = −0.28860E−01
A14 = 0.52154E−02

5th surface

κ = −0.40130E+01
A4 = −0.57076E−02
A6 = 0.54950E−01
A8 = −0.32504E−01
A10 = −0.32334E−01
A12 = 0.50951E−01
A14 = −0.26492E−01
A16 = 0.52589E−02

6th surface

κ = −0.18652E+02
A4 = −0.51296E−02
A6 = 0.16210E−01
A8 = 0.11051E−01
A10 = −0.19758E−02
A12 = −0.36936E−02
A14 = −0.11456E−02

7th surface

κ = 0.28752E+01
A4 = −0.87428E−02
A6 = 0.20679E−01
A8 = −0.12226E−01
A10 = 0.55209E−02
A12 = 0.22920E−02
A14 = −0.10033E−02

8th surface

κ = 0.28038E+00
A4 = −0.86890E−01
A6 = 0.56016E−01
A8 = −0.10600E−01
A10 = −0.10178E−02
A12 = 0.98190E−03
A14 = −0.16322E−03

9th surface

κ = −0.31074E+01
A4 = −0.89276E−01
A6 = 0.31854E−01
A8 = −0.17627E−02
A10 = −0.29615E−04
A12 = −0.10738E−03
A14 = 0.14792E−04

10th surface

κ = −0.30000E+02
A4 = −0.19852E−01
A6 = 0.47052E−02
A8 = −0.39385E−04
A10 = −0.12634E−03
A12 = 0.17570E−04
A14 = −0.72592E−06

11th surface

κ = −0.90262E+01
A4 = −0.30313E−01
A6 = 0.41565E−02
A8 = −0.55951E−03
A10 = 0.76680E−04
A12 = −0.80720E−05
A14 = 0.35155E−06

The following shows the single lens data of the image pickup lens in Example 7:

| Lens | Starting surface | Focal distance (mm) |
|---|---|---|
| 1 | 1 | 4.043 |
| 2 | 4 | −4.414 |

-continued

| Lens | Starting surface | Focal distance (mm) |
|---|---|---|
| 3 | 6 | 5.058 |
| 4 | 8 | 2.003 |
| 5 | 10 | −1.776 |

Figure 13:
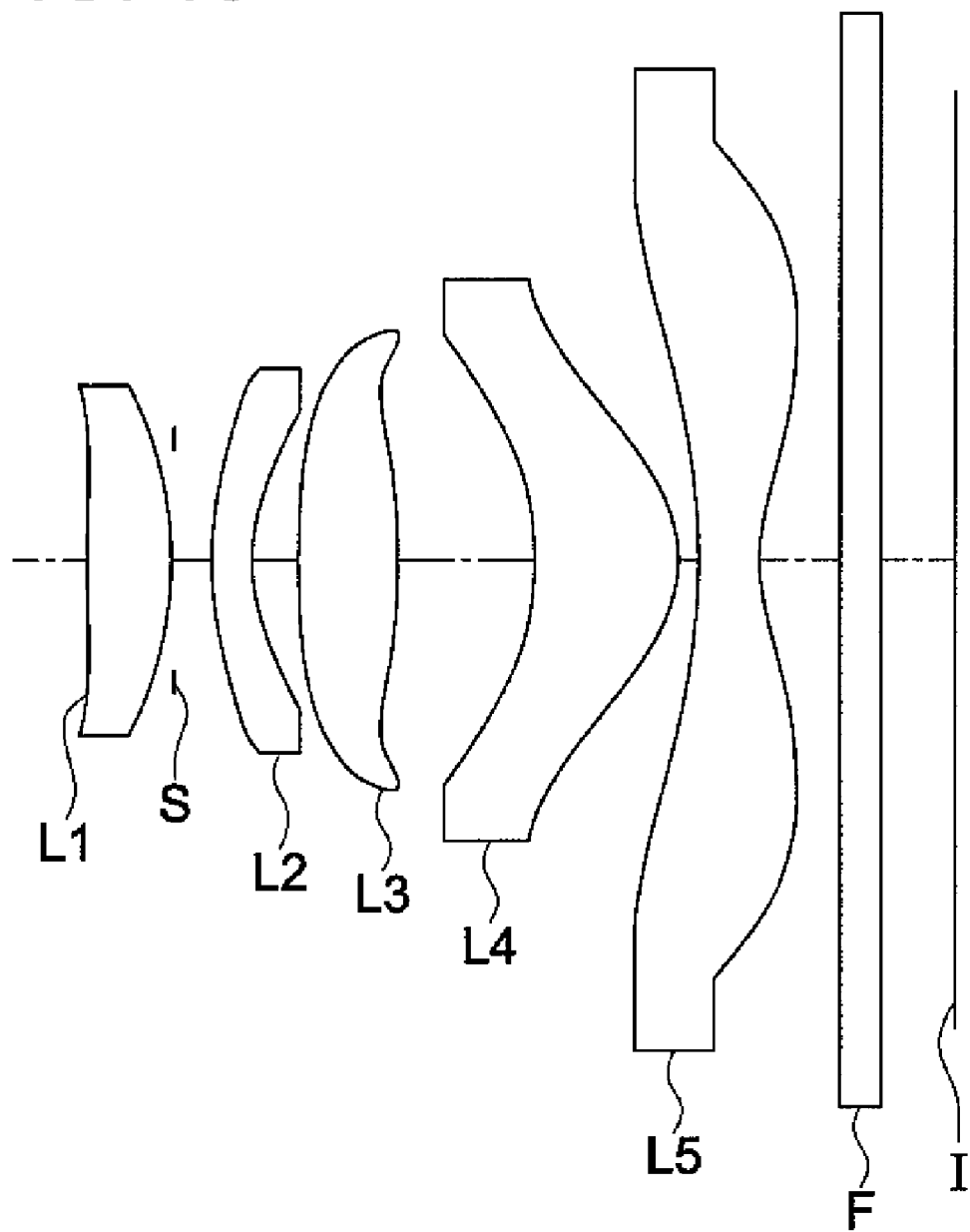
FIG. 13 is a cross sectional view of the image pickup lens of Example 7.

FIG. 13 is a cross sectional view of an image pickup lens of Example 7. In FIG. 13, L1 is a first lens, L2 is a second lens, L3 is a third lens, L4 is a fourth lens, L5 is a fifth lens, S is an aperture stop, and I is an image pickup surface. F indicates a parallel flat plate wherein an optical low pass filter, IR cut filter, seal glass of the solid pickup element and others are assumed. In Example 7, an aperture stop S is arranged between the first lens L1 and second lens L2.

FIG. 14 is a diagram representing aberrations ((a) spherical aberration, (b) astigmatism, (c) distortion aberration, (d) meridional comatic aberration) of the image pickup lens of Example 7. In the astigmatism diagram, the solid line indicates a sagittal image surface (S) and the broken line denotes a meridional image surface (M).

In Example 7, all the lenses are formed of plastics. For example, when the focal point position is adjusted in the auto-focusing and macro switchover functions, the partial feed-out operation is preferably performed, wherein the first lens L1 through third lens L3 are moved as an integral device.

Example 8

Table 8 shows the lens data of the image pickup lens in Example 8.

TABLE 8

Example 8

$f = 4.67$ mm $fB = 0.31$ mm $F = 2.8$ $2Y = 7.016$ mm
$ENTP = 0.59$ mm $EXTP = -2.96$ mm
$H1 = -1.44$ mm $H2 = -4.37$ mm

| Surface no. | R (mm) | D (mm) | Nd | νd | Effective radius (mm) |
|---|---|---|---|---|---|
| 1* | 2.107 | 0.76 | 1.54470 | 56.2 | 1.12 |
| 2* | −15.439 | 0.02 | | | 0.83 |
| 3 (Stop) | ∞ | 0.07 | | | 0.74 |
| 4* | 4.180 | 0.30 | 1.64900 | 21.0 | 0.78 |
| 5* | 1.884 | 0.47 | | | 0.86 |
| 6* | −6.749 | 0.66 | 1.54470 | 56.2 | 1.15 |
| 7* | −2.568 | 0.70 | | | 1.36 |
| 8* | −2.134 | 0.86 | 1.54470 | 56.2 | 1.69 |
| 9* | −0.924 | 0.30 | | | 1.94 |
| 10* | −2.046 | 0.45 | 1.54470 | 56.2 | 2.52 |
| 11* | 1.936 | 0.60 | | | 2.96 |
| 12 | ∞ | 0.30 | 1.51630 | 64.1 | 3.41 |
| 13 | ∞ | | | | 3.50 |

Aspherical surface coefficient

1st surface

κ = −0.15681E−02
A4 = −0.23464E−02
A6 = −0.27959E−02
A8 = 0.11494E−02
A10 = −0.28426E−02
A12 = 0.14864E−02
A14 = −0.13850E−02

2nd surface

κ = 0.30000E+02
A4 = 0.13699E−01
A6 = 0.30116E−02
A8 = −0.15728E−01

TABLE 8-continued

Example 8

A10 = 0.85925E−03
A12 = −0.78693E−02
A14 = 0.68234E−02

4th surface

κ = −0.12978E+02
A4 = −0.19679E−01
A6 = 0.60097E−01
A8 = −0.73337E−01
A10 = 0.31931E−01
A12 = −0.89967E−02
A14 = −0.12346E−02

5th surface

κ = −0.34001E+01
A4 = 0.57371E−02
A6 = 0.56342E−01
A8 = −0.22747E−01
A10 = −0.16566E−01
A12 = 0.26084E−01
A14 = −0.12265E−01
A16 = 0.80000E−11

6th surface

κ = 0.58619E+01
A4 = −0.23168E−01
A6 = −0.10695E−01
A8 = 0.24886E−01
A10 = 0.56848E−02
A12 = 0.71579E−03
A14 = −0.21690E−02

7th surface

κ = 0.12494E+01
A4 = −0.30591E−02
A6 = 0.15131E−01
A8 = −0.13268E−01
A10 = 0.73010E−02
A12 = 0.21338E−02
A14 = −0.91988E−03

8th surface

κ = 0.19356E+00
A4 = −0.41653E−01
A6 = 0.40686E−01
A8 = −0.66390E−02
A10 = −0.99019E−03
A12 = 0.76650E−03
A14 = −0.84869E−04

9th surface

κ = −0.29466E+01
A4 = −0.92384E−01
A6 = 0.31397E−01
A8 = −0.18689E−02
A10 = 0.49227E−04
A12 = −0.81750E−04
A14 = 0.10134E−04

10th surface

κ = −0.13086E+02
A4 = −0.46746E−01
A6 = 0.99406E−02
A8 = −0.63855E−04
A10 = −0.15604E−03
A12 = 0.16622E−04
A14 = −0.57264E−06

11th surface

κ = −0.16136E+02
A4 = −0.26680E−01
A6 = 0.37591E−02
A8 = −0.67508E−03
A10 = 0.89541E−04
A12 = −0.68651E−05
A14 = 0.22984E−06

The following shows the single lens data of the image pickup lens in Example 8:

| Lens | Starting surface | Focal distance (mm) |
|---|---|---|
| 1 | 1 | 3.455 |
| 2 | 4 | −5.574 |
| 3 | 6 | 7.210 |
| 4 | 8 | 2.389 |
| 5 | 10 | −1.756 |

Figure 15:
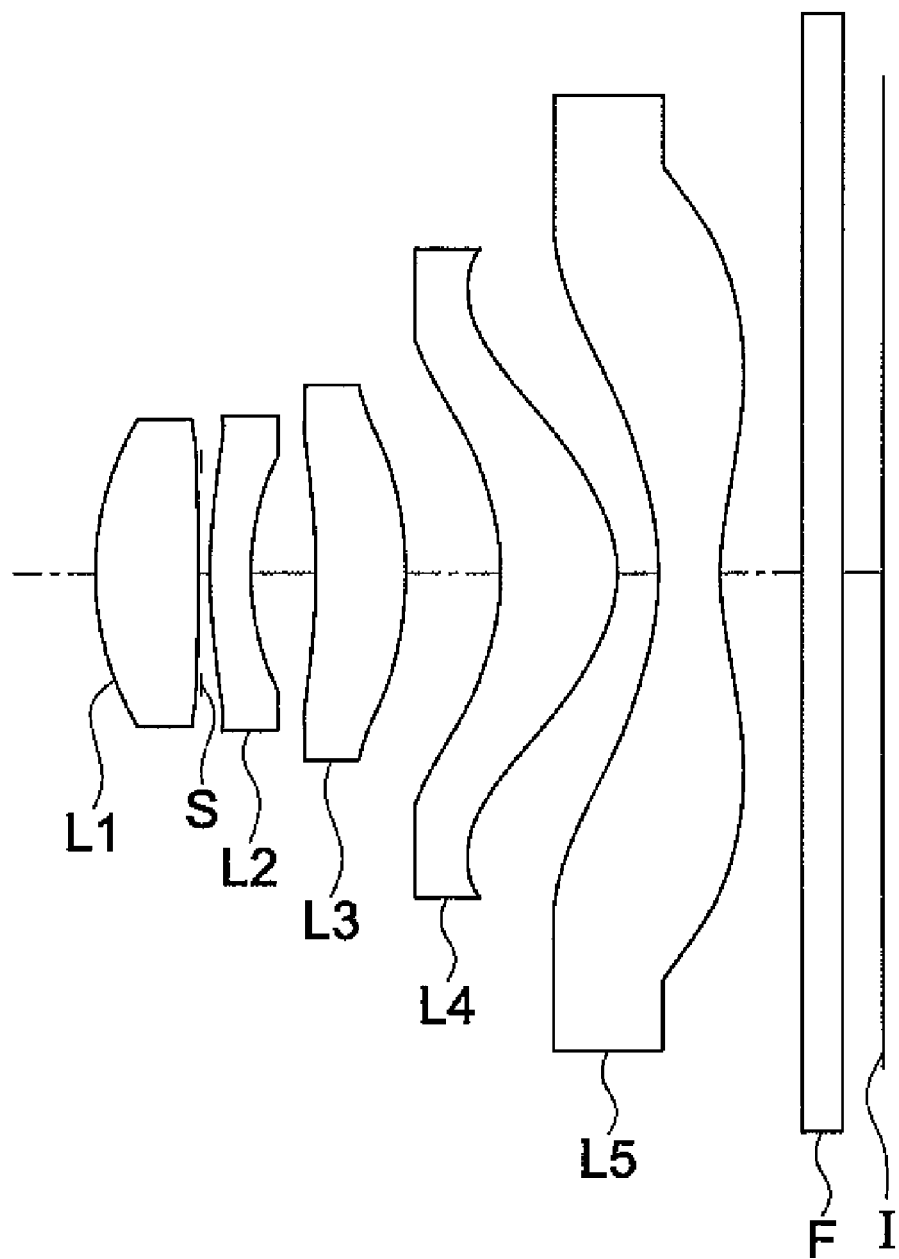
FIG. 15 is a cross sectional view of the image pickup lens of Example 8.

FIG. 15 is a cross sectional view of an image pickup lens of Example 8. In FIG. 15, L1 is a first lens, L2 is a second lens, L3 is a third lens, L4 is a fourth lens, L5 is a fifth lens, S is an aperture stop, and I is an image pickup surface. F indicates a parallel flat plate wherein an optical low pass filter, IR cut filter, seal glass of the solid pickup element and others are assumed. In Example 8, an aperture stop S is arranged between the first lens L1 and second lens L2.

FIG. 16 is a diagram representing aberrations ((a) spherical aberration, (b) astigmatism, (c) distortion aberration, (d) meridional comatic aberration) of the image pickup lens of Example 8. In the astigmatism diagram, the solid line indicates a sagittal image surface (S) and the broken line denotes a meridional image surface (M).

In Example 8, all the lenses are formed of plastics. For example, when the focal point position is adjusted in the auto-focusing and macro switchover functions, the partial feed-out operation is preferably performed, wherein the first lens L1 through third lens L3 are moved as an integral device.

Example 9

Table 9 shows the lens data of the image pickup lens in Example 9.

TABLE 9

Example 9 f = 4.67 mm fB = 0.3 mm F = 2.8 2Y = 7.016 mm
ENTP = 0.58 mm EXTP = −3.07 mm
H1 = −1.24 mm H2 = −4.38 mm

| Surface no. | R (mm) | D (mm) | Nd | vd | Effective radius (mm) |
|---|---|---|---|---|---|
| 1* | 2.313 | 0.76 | 1.54470 | 56.2 | 1.13 |
| 2* | −12.652 | 0.02 | | | 0.83 |
| 3 (Stop) | ∞ | 0.07 | | | 0.75 |
| 4* | 3.715 | 0.30 | 1.63200 | 23.4 | 0.79 |
| 5* | 1.734 | 0.45 | | | 0.89 |
| 6* | −8.862 | 0.76 | 1.58910 | 61.1 | 1.16 |
| 7* | −2.478 | 0.83 | | | 1.35 |
| 8* | −2.218 | 0.90 | 1.54470 | 56.2 | 1.67 |
| 9* | −0.980 | 0.23 | | | 2.07 |
| 10* | −2.698 | 0.45 | 1.54470 | 56.2 | 2.71 |
| 11* | 1.701 | 0.60 | | | 3.09 |
| 12 | ∞ | 0.30 | 1.51630 | 64.1 | 3.49 |
| 13 | ∞ | | | | 3.57 |

Aspherical surface coefficient

1st surface

κ = 0.97186E−01
A4 = −0.94631E−03
A6 = −0.28566E−03
A8 = 0.36779E−03
A10 = −0.20406E−02
A12 = 0.23246E−02
A14 = −0.18359E−02

TABLE 9-continued

Example 9

2nd surface

κ = 0.67915E+01
A4 = 0.18206E−01
A6 = 0.46032E−02
A8 = −0.16908E−01
A10 = −0.13960E−02
A12 = −0.73221E−02
A14 = 0.68532E−02

4th surface

κ = −0.20116E+02
A4 = −0.24861E−01
A6 = 0.56448E−01
A8 = −0.91808E−01
A10 = 0.37741E−01
A12 = −0.93298E−02
A14 = −0.71291E−03

5th surface

κ = −0.41386E+01
A4 = −0.26872E−03
A6 = 0.54444E−01
A8 = −0.31803E−01
A10 = −0.26060E−01
A12 = 0.35781E−01
A14 = −0.12494E−01
A16 = −0.11993E−03

6th surface

κ = −0.44241E+01
A4 = −0.22642E−01
A6 = −0.15984E−02
A8 = 0.23377E−01
A10 = 0.44175E−02
A12 = 0.11647E−03
A14 = −0.25060E−02

7th surface

κ = 0.12695E+01
A4 = −0.17191E−01
A6 = 0.20975E−01
A8 = −0.15257E−01
A10 = 0.62112E−02
A12 = 0.24367E−02
A14 = −0.45892E−03

8th surface

κ = 0.43440E+00
A4 = −0.63740E−01
A6 = 0.43260E−01
A8 = −0.61021E−02
A10 = −0.10552E−02
A12 = 0.74337E−03
A14 = −0.79867E−04

9th surface

κ = −0.34101E+01
A4 = −0.86672E−01
A6 = 0.30767E−01
A8 = −0.21200E−02
A10 = 0.13728E−04
A12 = −0.78087E−04
A14 = 0.10176E−04

10th surface

κ = −0.26305E+02
A4 = −0.46443E−01
A6 = 0.98343E−02
A8 = −0.83290E−04
A10 = −0.15737E−03
A12 = 0.16668E−04
A14 = −0.53213E−06

11th surface

κ = −0.10973E+02
A4 = −0.28154E−01
A6 = 0.41392E−02

TABLE 9-continued

Example 9

A8 = −0.70320E−03
A10 = 0.89239E−04
A12 = −0.64265E−05
A14 = 0.19772E−06

The following shows the single lens data of the image pickup lens in Example 9:

| Lens | Starting surface | Focal distance (mm) |
|---|---|---|
| 1 | 1 | 3.656 |
| 2 | 4 | −5.468 |
| 3 | 6 | 5.593 |
| 4 | 8 | 2.563 |
| 5 | 10 | −1.849 |

Figure 17:
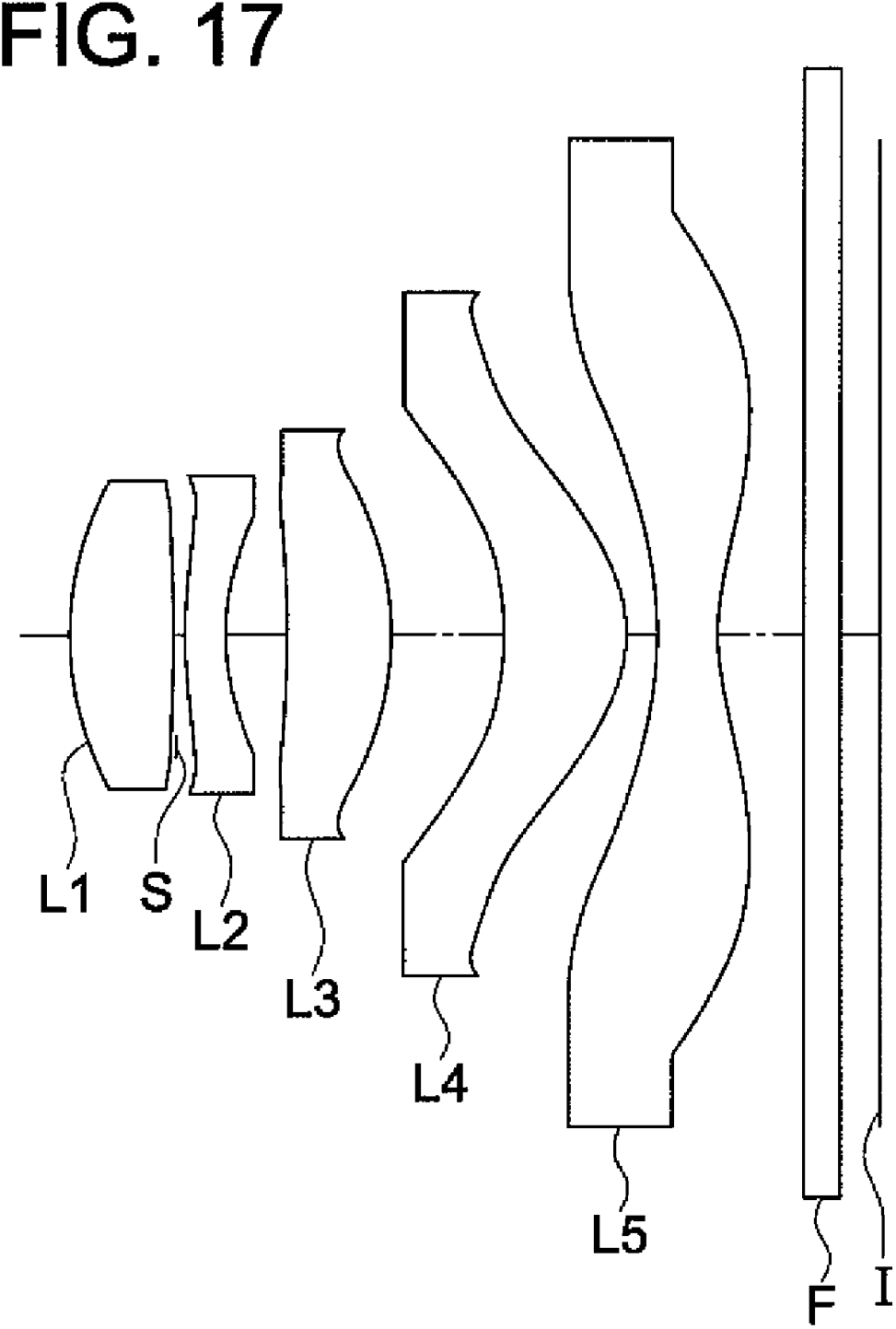
FIG. 17 is a cross sectional view of the image pickup lens of Example 9.

FIG. 17 is a cross sectional view of an image pickup lens of Example 9. In FIG. 17, L1 is a first lens, L2 is a second lens, L3 is a third lens, L4 is a fourth lens, L5 is a fifth lens, S is an aperture stop, and I is an image pickup surface. F indicates a parallel flat plate wherein an optical low pass filter, IR cut filter, seal glass of the solid pickup element and others are assumed. In Example 9, an aperture stop S is arranged between the first lens L1 and second lens L2.

FIG. 18 is a diagram representing aberrations ((a) spherical aberration, (b) astigmatism, (c) distortion aberration, (d) meridional comatic aberration) of the image pickup lens of Example 9. In the astigmatism diagram, the solid line indicates a sagittal image surface (S) and the broken line denotes a meridional image surface (M).

In Example 9, the third lens L3 is a glass-molded lens, and the other lenses are made of plastics. For example, when the focal point position is adjusted in the auto-focusing and macro switchover functions, the partial feed-out operation is preferably performed, wherein the first lens L1 through third lens L3 are moved as an integral device.

Example 10

Table 10 shows the lens data of the image pickup lens in Example 10.

TABLE 10

Example 10 f = 4.67 mm fB = 0.29 mm F = 2.8 2Y = 7.016 mm
ENTP = 0.82 mm EXTP = −3.05 mm
H1 = −1.04 mm H2 = −4.39 mm

| Surface no. | R (mm) | D (mm) | Nd | νd | Effective radius (mm) |
|---|---|---|---|---|---|
| 1* | 2.811 | 1.06 | 1.54470 | 56.2 | 1.30 |
| 2* | −12.029 | 0.02 | | | 0.81 |
| 3 (Stop) | ∞ | 0.07 | | | 0.72 |
| 4* | 3.079 | 0.30 | 1.63200 | 23.4 | 0.77 |
| 5* | 1.561 | 0.38 | | | 0.91 |
| 6* | −39.785 | 0.87 | 1.58910 | 61.1 | 1.20 |
| 7* | −2.340 | 0.84 | | | 1.39 |
| 8* | −2.153 | 0.94 | 1.54470 | 56.2 | 1.69 |
| 9* | −0.970 | 0.21 | | | 2.22 |
| 10* | −2.655 | 0.45 | 1.54470 | 56.2 | 2.70 |
| 11* | 1.628 | 0.60 | | | 3.08 |
| 12 | ∞ | 0.30 | 1.51630 | 64.1 | 3.50 |
| 13 | ∞ | | | | 3.58 |

TABLE 10-continued

Example 10

Aspherical surface coefficient

1st surface

κ = 0.29635E+00
A4 = 0.11942E−02
A6 = 0.22974E−02
A8 = 0.28564E−03
A10 = −0.27486E−02
A12 = 0.24872E−02
A14 = −0.75895E−03

2nd surface

κ = 0.22113E+02
A4 = 0.16558E−01
A6 = 0.16445E−01
A8 = −0.18224E−01
A10 = −0.58214E−02
A12 = −0.70137E−02
A14 = 0.10337E−01

4th surface

κ = −0.23385E+02
A4 = −0.41820E−01
A6 = 0.39134E−01
A8 = −0.91842E−01
A10 = 0.43876E−01
A12 = −0.14007E−01
A14 = 0.20593E−02

5th surface

κ = −0.47141E+01
A4 = −0.16535E−01
A6 = 0.40546E−01
A8 = −0.34027E−01
A10 = −0.25157E−01
A12 = 0.35473E−01
A14 = −0.10236E−01
A16 = −0.28428E−03

6th surface

κ = −0.30000E+02
A4 = −0.86458E−02
A6 = 0.45588E−02
A8 = 0.17121E−01
A10 = −0.24092E−02
A12 = −0.18320E−02
A14 = −0.26831E−04

7th surface

κ = 0.11340E+01
A4 = −0.14115E−01
A6 = 0.19371E−01
A8 = −0.13477E−01
A10 = 0.48832E−02
A12 = 0.15223E−02
A14 = −0.12832E−03

8th surface

κ = 0.47814E+00
A4 = −0.55984E−01
A6 = 0.44810E−01
A8 = −0.65063E−02
A10 = −0.96363E−03
A12 = 0.83709E−03
A14 = −0.10298E−03

9th surface

κ = −0.34217E+01
A4 = −0.78608E−01
A6 = 0.31190E−01
A8 = −0.20927E−02
A10 = 0.17624E−04
A12 = −0.79135E−04
A14 = 0.87043E−05

TABLE 10-continued

Example 10

10th surface

κ = −0.21244E+02
A4 = −0.47326E−01
A6 = 0.10015E−01
A8 = −0.41485E−04
A10 = −0.15710E−03
A12 = 0.15995E−04
A14 = −0.54764E−06

11th surface

κ = −0.11533E+02
A4 = −0.28462E−01
A6 = 0.41371E−02
A8 = −0.69080E−03
A10 = 0.87630E−04
A12 = −0.67086E−05
A14 = 0.22488E−06

The following shows the single lens data of the image pickup lens in Example 10:

| Lens | Starting surface | Focal distance (mm) |
|---|---|---|
| 1 | 1 | 4.292 |
| 2 | 4 | −5.423 |
| 3 | 6 | 4.184 |
| 4 | 8 | 2.532 |
| 5 | 10 | −1.786 |

Figure 19:
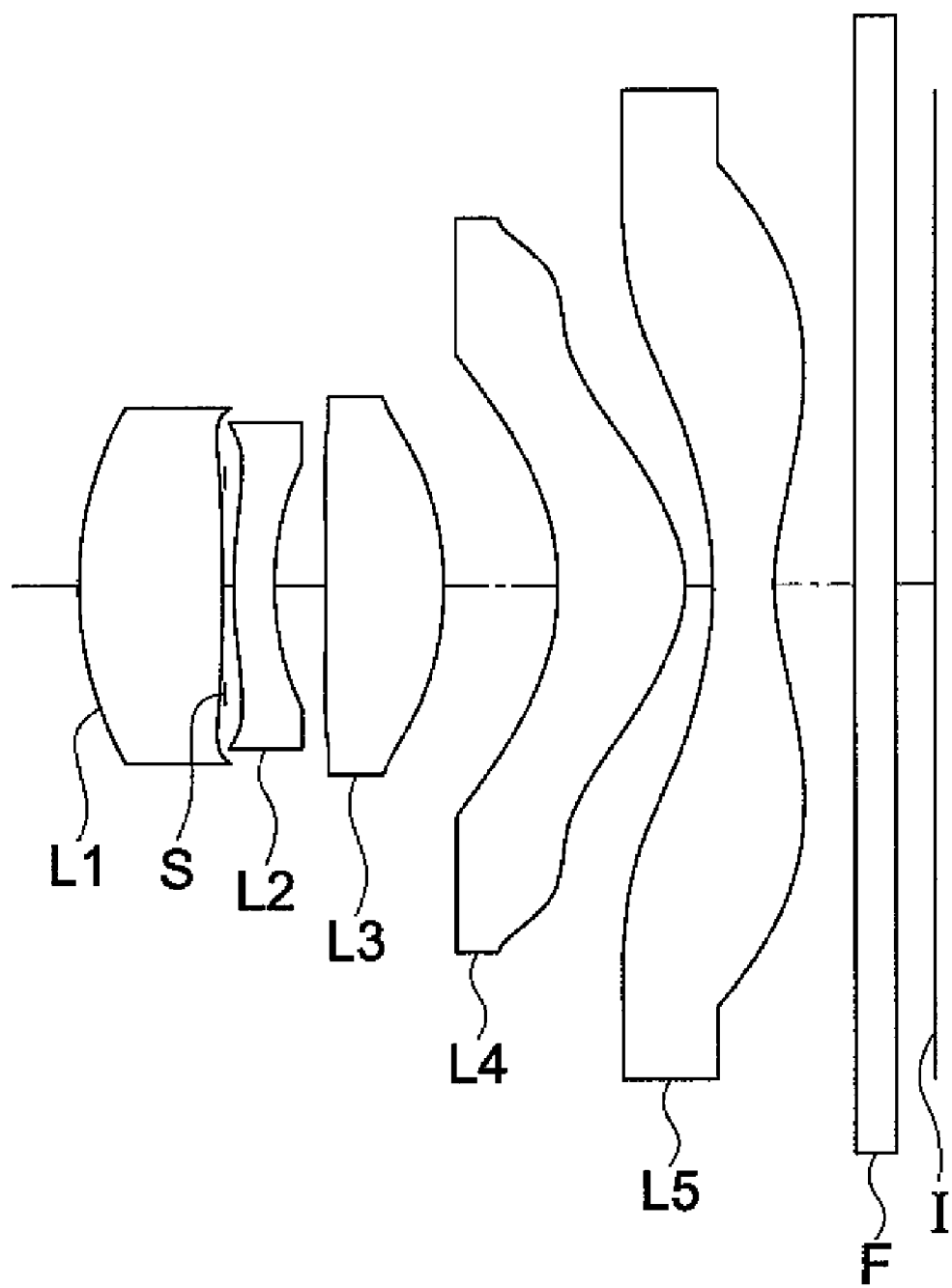
FIG. 19 is a cross sectional view of the image pickup lens of Example 10.

FIG. 19 is a cross sectional view of an image pickup lens of Example 10. In FIG. 19, L1 is a first lens, L2 is a second lens, L3 is a third lens, L4 is a fourth lens, L5 is a fifth lens, S is an aperture stop, and I is an image pickup surface. F indicates a parallel flat plate wherein an optical low pass filter, IR cut filter, seal glass of the solid pickup element and others are assumed. In Example 10, an aperture stop S is arranged between the first lens L1 and second lens L2.

FIG. 20 is a diagram representing aberrations ((a) spherical aberration, (b) astigmatism, (c) distortion aberration, (d) meridional comatic aberration) of the image pickup lens of Example 10. In the astigmatism diagram, the solid line indicates a sagittal image surface (S) and the broken line denotes a meridional image surface (M).

In Example 10, the third lens L3 is a glass-molded lens, and the other lenses are made of plastics. For example, when the focal point position is adjusted in the auto-focusing and macro switchover functions, the partial feed-out operation is preferably performed, wherein the first lens L1 through third lens L3 are moved as an integral device.

Example 11

Table 11 shows the lens data of the image pickup lens in Example 11.

TABLE 11

Example 11 f = 4.17 mm fB = 0.3 mm F = 2.8 2Y = 5.744 mm
ENTP = 0.6 mm EXTP = −2.4 mm
H1 = −1.69 mm H2 = −3.87 mm

| Surface no. | R (mm) | D (mm) | Nd | νd | Effective radius (mm) |
|---|---|---|---|---|---|
| 1* | 1.748 | 0.75 | 1.54470 | 56.2 | 1.03 |
| 2* | −19.560 | 0.02 | | | 0.79 |

TABLE 11-continued

Example 11

| | | | | | |
|---|---|---|---|---|---|
| 3 (Stop) | ∞ | 0.06 | | | 0.64 |
| 4* | 8.299 | 0.30 | 1.63200 | 23.4 | 0.74 |
| 5* | 2.338 | 0.53 | | | 0.80 |
| 6* | −6.980 | 0.84 | 1.54470 | 56.2 | 0.99 |
| 7* | −1.881 | 0.32 | | | 1.26 |
| 8* | −1.649 | 0.56 | 1.54470 | 56.2 | 1.37 |
| 9* | −1.137 | 0.44 | | | 1.67 |
| 10* | −1.497 | 0.40 | 1.54470 | 56.2 | 2.16 |
| 11* | 5.410 | 0.30 | | | 2.43 |
| 12 | ∞ | 0.30 | 1.51630 | 64.1 | 2.78 |
| 13 | ∞ | | | | 2.86 |

Aspherical surface coefficient

1st surface

κ = 0.15766E+00
A4 = −0.14963E−02
A6 = 0.48359E−02
A8 = −0.13113E−01
A10 = −0.43792E−02
A12 = 0.31241E−01
A14 = −0.25907E−01

2nd surface

κ = −0.25456E+02
A4 = 0.43701E−01
A6 = −0.64451E−01
A8 = 0.23148E−01
A10 = 0.23833E−01
A12 = −0.15489E+00
A14 = 0.99605E−01

4th surface

κ = 0.12894E+02
A4 = 0.31310E−02
A6 = 0.86051E−02
A8 = −0.19821E+00
A10 = 0.29891E+00
A12 = −0.21295E+00
A14 = −0.20786E−01

5th surface

κ = −0.33700E+01
A4 = 0.26003E−01
A6 = 0.61884E−01
A8 = −0.16311E+00
A10 = 0.22170E+00
A12 = −0.11659E+00
A14 = −0.63095E−02

6th surface

κ = 0.82099E+00
A4 = −0.41380E−01
A6 = −0.45417E−01
A8 = 0.25176E−01
A10 = 0.35102E−01
A12 = −0.80497E−01
A14 = 0.44465E−01

7th surface

κ = 0.19392E+00
A4 = −0.28552E−02
A6 = −0.24011E−01
A8 = 0.11594E−01
A10 = −0.57039E−02
A12 = −0.62721E−02
A14 = 0.44606E−02

8th surface

κ = 0.34240E+00
A4 = −0.43883E−01
A6 = 0.61029E−01
A8 = −0.57459E−02
A10 = −0.37261E−02
A12 = −0.10637E−02
A14 = 0.23848E−02

TABLE 11-continued

Example 11

9th surface

κ = −0.16292E+01
A4 = −0.68873E−01
A6 = 0.42844E−01
A8 = −0.41365E−02
A10 = 0.20662E−02
A12 = −0.41222E−03
A14 = −0.67005E−04

10th surface

κ = −0.16831E+01
A4 = −0.50598E−01
A6 = 0.29098E−01
A8 = −0.15805E−02
A10 = −0.10577E−02
A12 = 0.22674E−03
A14 = −0.14088E−04

11th surface

κ = 0.37594E+01
A4 = −0.77861E−01
A6 = 0.16464E−01
A8 = −0.30191E−02
A10 = 0.42424E−03
A12 = −0.48571E−04
A14 = 0.22523E−05

The following shows the single lens data of the image pickup lens in Example 11:

| Lens | Starting surface | Focal distance (mm) |
|---|---|---|
| 1 | 1 | 2.983 |
| 2 | 4 | −5.253 |
| 3 | 6 | 4.466 |
| 4 | 8 | 4.859 |
| 5 | 10 | −2.110 |

Figure 21:
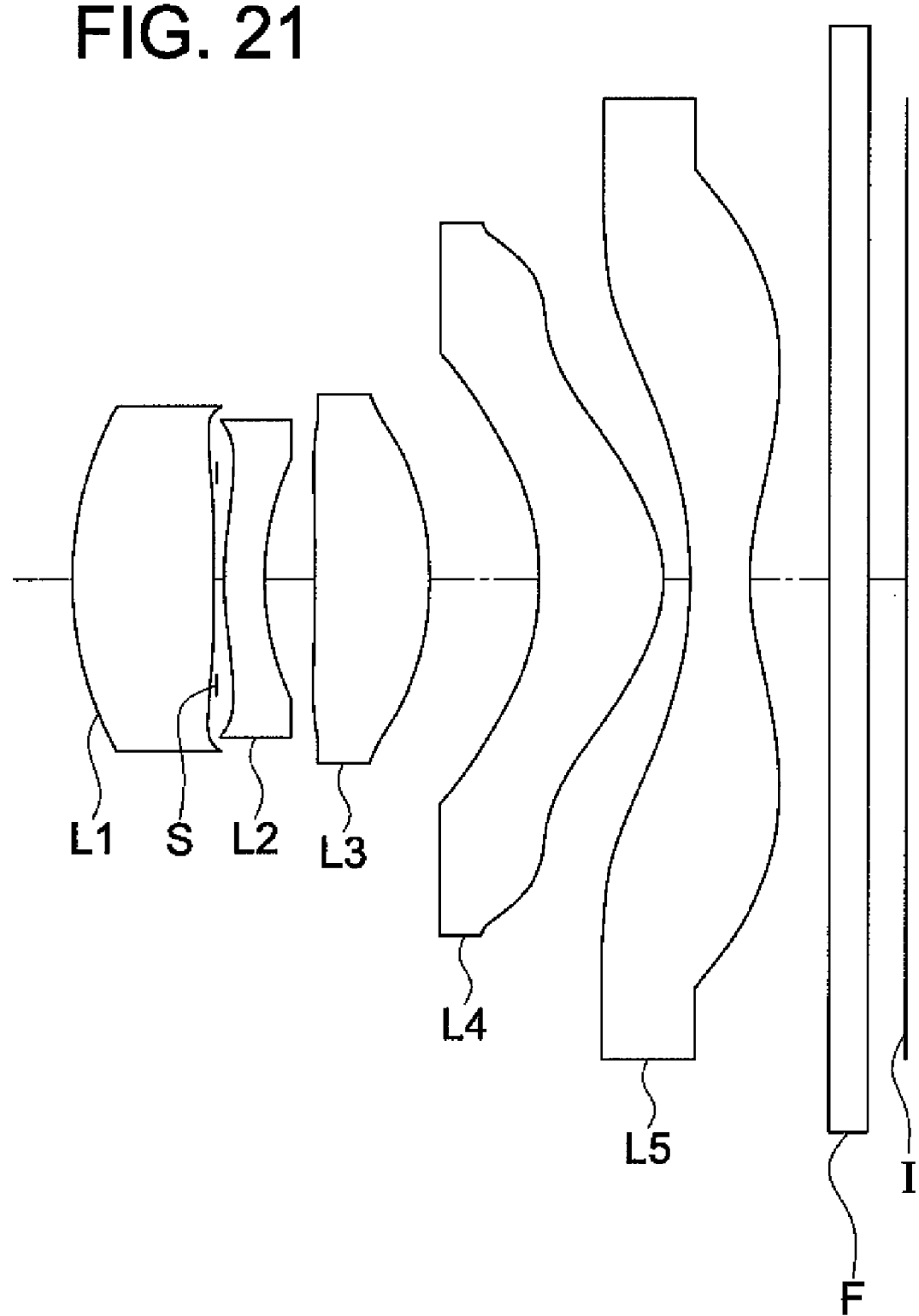
FIG. 21 is a cross sectional view of the image pickup lens of Example 11.

FIG. 21 is a cross sectional view of an image pickup lens of Example 11. In FIG. 21, L1 is a first lens, L2 is a second lens, L3 is a third lens, L4 is a fourth lens, L5 is a fifth lens, S is an aperture stop, and I is an image pickup surface. F indicates a parallel flat plate wherein an optical low pass filter, IR cut filter, seal glass of the solid pickup element and others are assumed. In Example 11, an aperture stop S is arranged between the first lens L1 and second lens L2.

FIG. 22 is a diagram representing aberrations ((a) spherical aberration, (b) astigmatism, (c) distortion aberration, (d) meridional somatic aberration) of the image pickup lens of Example 11. In the astigmatism diagram, the solid line indicates a sagittal image surface (S) and the broken line denotes a meridional image surface (M).

In Example 11, all the lenses are formed of plastics. For example, when the focal point position is adjusted in the auto-focusing and macro switchover functions, the partial feed-out operation is preferably performed, wherein only the third lens L3 is moved.

Example 12

Table 12 shows the lens data of the image pickup lens in Example 12.

TABLE 12

Example 12 f = 4.96 mm fB = 0.17 mm F = 2.8 2Y = 7.016 mm
ENTP = 1.1 mm EXTP = −2.65 mm
H1 = −2.67 mm H2 = −4.79 mm

| Surface no. | R (mm) | D (mm) | Nd | νd | Effective radius (mm) |
|---|---|---|---|---|---|
| 1* | 2.939 | 0.88 | 1.54470 | 56.2 | 1.52 |
| 2* | −6.209 | 0.05 | | | 1.28 |
| 3* | −53.876 | 0.30 | 1.63200 | 23.4 | 1.02 |
| 4* | 4.586 | 0.10 | | | 0.81 |
| 5 (Stop) | ∞ | 0.65 | | | 0.75 |
| 6* | −36.876 | 0.71 | 1.54470 | 56.2 | 1.09 |
| 7* | −3.143 | 1.07 | | | 1.34 |
| 8* | −2.511 | 0.47 | 1.54470 | 56.2 | 1.69 |
| 9* | −1.245 | 0.26 | | | 1.92 |
| 10* | −2.568 | 0.53 | 1.54470 | 56.2 | 2.42 |
| 11* | 2.027 | 0.60 | | | 3.06 |
| 12 | ∞ | 0.30 | 1.51630 | 64.1 | 3.49 |
| 13 | ∞ | | | | 3.63 |

Aspherical surface coefficient

1st surface

κ = −0.12368E+00
A4 = −0.68646E−02
A6 = 0.16896E−02
A8 = 0.70494E−03
A10 = −0.22716E−02
A12 = 0.22467E−02
A14 = −0.60725E−03

2nd surface

κ = −0.25799E+02
A4 = 0.19872E−01
A6 = 0.50745E−02
A8 = −0.10225E−01
A10 = 0.90566E−02
A12 = −0.80755E−02
A14 = 0.23810E−02

3rd surface

κ = 0.30000E+02
A4 = −0.24473E−01
A6 = 0.52491E−01
A8 = −0.76768E−01
A10 = 0.41597E−01
A12 = −0.17217E−01
A14 = 0.60489E−02

4th surface

κ = −0.26418E+02
A4 = −0.32680E−01
A6 = 0.23333E−01
A8 = −0.47780E−01
A10 = −0.10416E−01
A12 = 0.44526E−01
A14 = −0.12265E−01
A16 = −0.86300E−09

6th surface

κ = 0.30000E+02
A4 = −0.36942E−01
A6 = −0.90140E−02
A8 = −0.46471E−02
A10 = −0.47232E−02
A12 = 0.59994E−02
A14 = −0.54221E−02

7th surface

κ = 0.18745E+01
A4 = −0.18874E−01
A6 = 0.85010E−02
A8 = −0.13471E−01
A10 = 0.45202E−02
A12 = 0.41858E−03
A14 = −0.56435E−03

TABLE 12-continued

Example 12

8th surface

κ = 0.50138E+00
A4 = −0.72446E−01
A6 = 0.37772E−01
A8 = −0.58431E−02
A10 = −0.86653E−03
A12 = 0.71963E−03
A14 = −0.97875E−04

9th surface

κ = −0.37219E+01
A4 = −0.80603E−01
A6 = 0.30943E−01
A8 = −0.21617E−02
A10 = −0.32975E−05
A12 = −0.78382E−04
A14 = 0.13542E−04

10th surface

κ = −0.13303E+02
A4 = −0.48018E−01
A6 = 0.99328E−02
A8 = 0.18262E−04
A10 = −0.13838E−03
A12 = 0.17942E−04
A14 = −0.11491E−05

11th surface

κ = −0.11764E+02
A4 = −0.25174E−01
A6 = 0.50899E−02
A8 = −0.76929E−03
A10 = 0.85030E−04
A12 = −0.61675E−05
A14 = 0.21224E−06

The following shows the single lens data of the image pickup lens in Example 12:

| Lens | Starting surface | Focal distance (mm) |
|------|------------------|---------------------|
| 1    | 1                | 3.791               |
| 2    | 4                | −6.674              |
| 3    | 6                | 6.263               |
| 4    | 8                | 4.005               |
| 5    | 10               | −1.999              |

Figure 23:
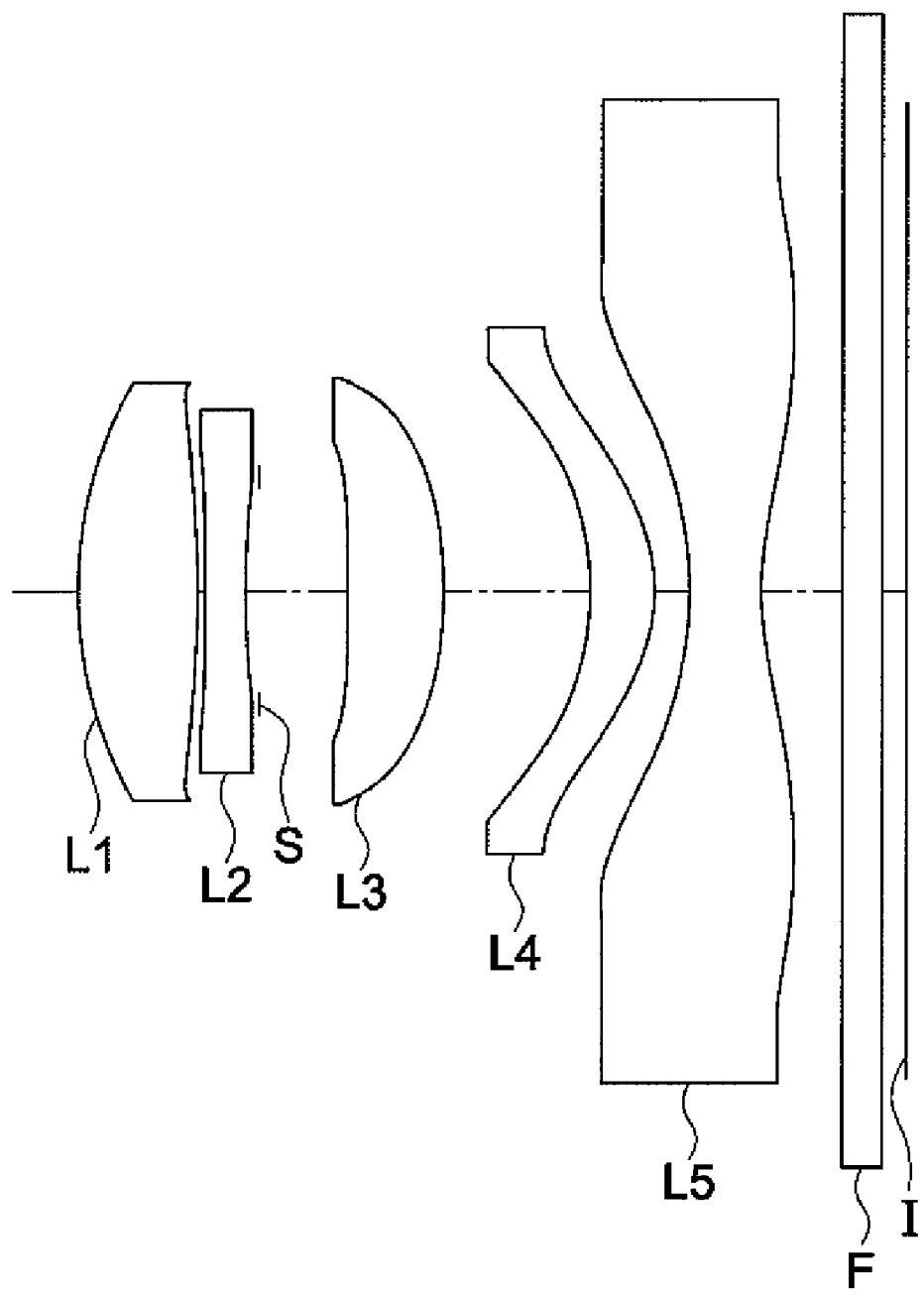
FIG. 23 is a cross sectional view of the image pickup lens of Example 12.

FIG. 23 is a cross sectional view of an image pickup lens of Example 12. In FIG. 23, L1 is a first lens, L2 is a second lens, L3 is a third lens, L4 is a fourth lens, L5 is a fifth lens, S is an aperture stop, and I is an image pickup surface. F indicates a parallel flat plate wherein an optical low pass filter, IR cut filter, seal glass of the solid pickup element and others are assumed. In Example 12, an aperture stop S is arranged between the second lens L2 and third lens L3.

FIG. 24 is a diagram representing aberrations ((a) spherical aberration, (b) astigmatism, (c) distortion aberration, (d) meridional comatic aberration) of the image pickup lens of Example 12. In the astigmatism diagram, the solid line indicates a sagittal image surface (S) and the broken line denotes a meridional image surface (M).

In Example 12, all the lenses are formed of plastics. For example, when the focal point position is adjusted in the auto-focusing and macro switchover functions, the partial feed-out operation is preferably performed, wherein the first lens L1 through third lens L3 are moved as an integral device.

In the above-mentioned Examples 1 through 12, reduction in the overall length of the image pickup lens requires the composite principal point of the entire image pickup lens system to be positioned closer to the object side. This results in an increase in the refractive power of the first lens. This may increase the sensitivity of the first lens to eccentric errors. In this case, it is preferred to use the first lens to make alignments, thereby reducing the asymmetrical blur inside the screen, which is also called an unbalanced blur and occurs in the entire system.

To put it more specifically, the first lens should be subjected to parallel decentering or inclined decentering with reference to the second through fifth lenses incorporated in the case of a fixed focal point, whereby the unbalanced blur caused by lenses other than the first lens is cancelled and is reduced. Further, if the focal point position is to be adjusted by moving the first lens through third lenses as an integral device, the first lens should be subjected to parallel decentering or included decentering with reference to the incorporated second and third lenses. Alternatively, alignment can be performed to reduce the on-axis comatic aberration instead of the unbalanced blur.

Table 13 shows the values of the Examples corresponding to the conditional expressions, respectively.

TABLE 13

|  | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|
| (1)f3/f1 | 2.26 | 2.29 | 2.00 | 1.99 | 1.99 | 1.97 | 1.25 | 2.09 | 1.53 | 0.97 | 1.50 | 1.65 |
| (2)ν3 | 56.0 | 56.0 | 56.0 | 56.0 | 56.0 | 56.0 | 56.0 | 56.0 | 61.1 | 61.1 | 56.0 | 56.0 |
| (3)(R5 + R6)/(R5 − R6) | 2.05 | 1.35 | 0.70 | 1.75 | 2.15 | 2.07 | 0.10 | 2.23 | 1.78 | 1.12 | 1.74 | 1.19 |
| (4)R7/f | −0.58 | −0.54 | −0.63 | −0.57 | −0.47 | −0.49 | −0.54 | −0.46 | −0.47 | −0.46 | −0.40 | −0.51 |
| (5)f5/f | −0.49 | −0.45 | −0.39 | −0.44 | −0.39 | −0.60 | −0.38 | −0.38 | −0.40 | −0.38 | −0.51 | −0.40 |
| (6)ν2 | 23.4 | 23.4 | 30.0 | 23.4 | 23.4 | 23.4 | 23.4 | 21.0 | 23.4 | 23.4 | 23.4 | 23.4 |
| (7)N2 | 1.632 | 1.632 | 1.583 | 1.632 | 1.632 | 1.632 | 1.632 | 1.649 | 1.632 | 1.632 | 1.632 | 1.632 |
| (8)D6/f | 0.16 | 0.17 | 0.20 | 0.17 | 0.16 | 0.16 | 0.22 | 0.15 | 0.18 | 0.18 | 0.08 | 0.22 |
| (9)θEH | 39° | 39° | 22° | 27° | 23° | 32° | 37° | 39° | 33° | 39° | 25° | 1° |
| (10)ΣD/f | 0.99 | 0.97 | 0.96 | 0.99 | 0.98 | 0.93 | 1.07 | 0.98 | 1.02 | 1.10 | 1.01 | 1.01 |
| (11)L/2Y | 0.82 | 0.80 | 0.81 | 0.81 | 0.81 | 0.80 | 0.90 | 0.81 | 0.83 | 0.89 | 0.87 | 0.85 |

The plastic material undergoes a greater change in refractive index when there is a temperature change. Accordingly, if all the lenses from the first to fifth lenses are made of plastics, the image point of the entire image pickup lens system will be displaced when there is a change in ambient temperature, and this will raise problems in some cases. In recent years, it has been revealed that a change in the temperature of the plastic material can be reduced by mixing inorganic particles into the plastic material.

To put it in more detail, when the transparent plastic material is mixed with particles, light scattering generally occurs, and transmittance is reduced. Thus, it has been difficult to use plastics as an optical material. However, if the size of the particles is reduced below the wavelength of the transparent light flux, scattering can be practically eliminated. A rise in the temperature of the plastic material reduces the refractive index, but the refractive index of the inorganic particles is increased when there is a temperature rise.

Thus, a change in the refractive index can be eliminated almost completely by mutual cancellation utilizing the aforementioned temperature dependency. To put it more specifically, inorganic particles having a maximum length of 20 nanometers or less are dispersed in the plastic material as a base material. This arrangement produces a plastic material wherein the temperature dependency of the refractive index is extremely low. For example, particles of niobium oxide ($Nb_2O_5$) are dispersed in acryl. This reduces changes in the refractive index caused by temperature changes. In the present invention, the positive lens (the first lens L1) having a greater refractive power, or all the lenses (first lens L1 through fifth lens L5) are made of a plastic material with inorganic particles dispersed therein, thereby minimizing the displacement of the image point in the event of a temperature change in the entire image pickup lens system.

In one of the low-cost and high-volume methods for mounting parts on an image pickup apparatus proposed in recent years, reflow processing (heat treatment) is applied to the substrate provided with solder potting in advance, with an IC chip and other electronic parts and optical element placed therein, so that the solder is molten. Thus, the electronic parts and optical element are mounted on the substrate simultaneously.

To use the reflow processing for mounting, the electronic parts together with the optical element must be heated to about 200 through 260 degrees Celsius. Under such a high temperature, the lens made of thermoplastic resin may be thermally deformed or discolored, and the optical performance thereof may be reduced. One way proposed to solve this problem is to use a glass molded lens characterized by excellent heat resistance, thereby ensuring compatibility between downsizing and satisfactory optical performances in a high-temperature environment. However, the lens produced by this method requires greater costs than the lens made of a thermoplastic resin. This proposal fails to meet the requirements for cutting down on the image pickup apparatus cost.

To solve such problems, energy-cured resin is used as the material of the image pickup lens. When exposed to high temperature, reduction in optical performance is smaller in this resin than in the lens made of thermoplastic resin such as polycarbonate or polyolefin resin. Thus, use of the energy-cured resin is effective in reflow processing and ensures easier production and less costs than use of a glass molded lens. This ensures compatibility between the low cost of the image pickup apparatus with a built-in image pickup lens, and high-volume production capacity. It should be noted in passing that the energy-cured resin refers to both the thermosetting resin and UV curable resin.

The lens made of plastics in the present Example can be produced using the aforementioned energy-cured resin.

In this Example, the incident angle of the main light in the light flux entering the image pickup surface of a solid pickup element is not necessarily designed to be sufficiently small on the periphery of the image pickup surface. However, the recently developed technique can reduce the shading by reconsidering the arrangement of the color filter of the solid pickup element and on-chip micro lens array. To put it more specifically, the pitch in the arrangement of the color filter and on-chip micro lens array is set slightly smaller than the pixel pitch of the image pickup surface of the pickup element. Then, as one goes further to the periphery of the image pickup surface, the color filter and on-chip micro lens array are shifted toward the optical axis of the image pickup lens, with respect to each pixel. Thus, the grading incidence light flux can be effectively guided to the light receiving section of each pixel. This reduces the shading occurring to the solid pickup element. The present Example provides a design example wherein greater efforts are made for downsizing by the amount equivalent to the alleviation of the aforementioned requirements.

Figure 25:
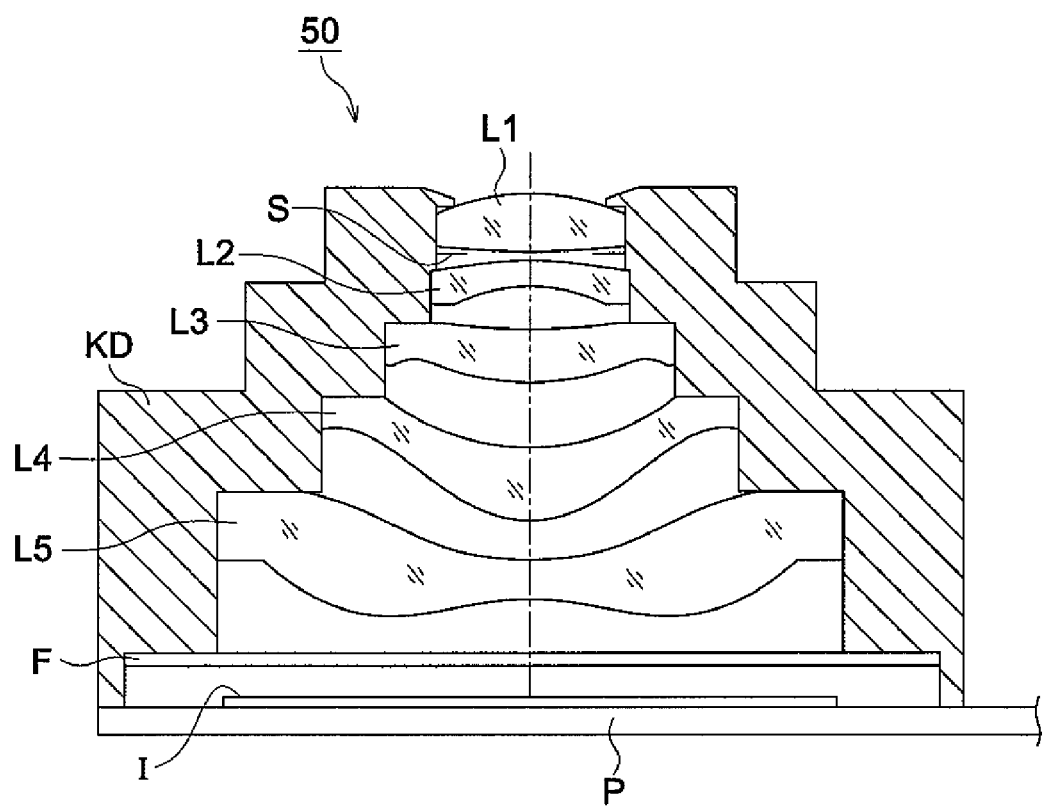
FIG. 25 is a schematic cross sectional view showing the outline of the image pickup apparatus equipped with the image pickup lens of the above-mentioned Examples.

FIG. 25 is a schematic cross sectional view showing the outline of the image pickup apparatus 50 equipped with the image pickup lens of the above-mentioned Example 1.

As shown in FIG. 25, a lens barrel KD holds:

a first lens L1 having a positive refractive power with the convex surface on the object side, an aperture stop S, a second lens L2 having a negative refractive power with the concave surface on the image side, a third lens L3 having a positive refractive power with the convex surface on the image side, a fourth meniscus lens L4 having a positive refractive power with the convex surface on the image side, a fifth lens L5 having a negative refractive power with the concave surface on the image side, and an IR-cut filter, arranged in that order as viewed from the object side.

The lens barrel KD is bonded to the substrate P mounted with a solid pickup element I having a photoelectric conversion surface on the object side. An external electrode (not illustrated) connected with the control section external to the image pickup apparatus is formed on the substrate P in such a way that operation control signals are inputted or outputted.

Although not illustrated, a fixed stop can be installed between lenses to cut off the unwanted light.

The image pickup apparatus of FIG. 25 is a fixed focal point type apparatus. When the focal point position is to be adjusted and the first through third lenses are to be moved as an integral unit, for example, in the auto-focusing and macro switchover functions, the first through third lenses should be incorporated in a separate barrel so that these lenses can be moved in the direction of optical axis by an actuator.

Figure 26:
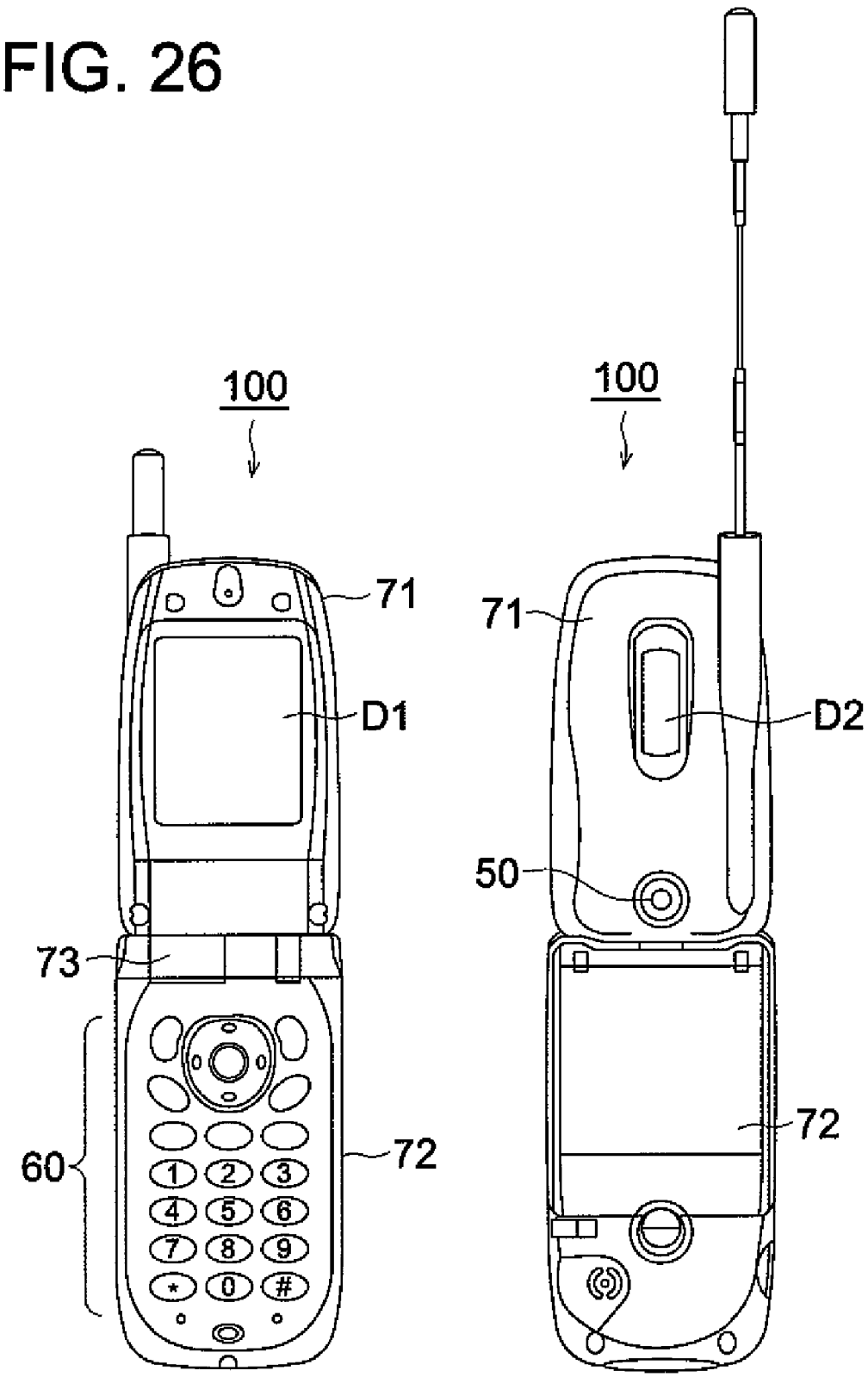
FIG. 26 is an external view of a mobile phone as an example of the portable terminal equipped with the image pickup apparatus of the present embodiment.

FIG. 26 is an external view of a mobile phone 100 as an example of the portable terminal equipped with the image pickup apparatus 50 of the present embodiment.

In the mobile phone 100 of FIG. 26, an upper enclosure 71 as a case equipped with display screens D1 and D2 and a lower enclosure 72 equipped with an operation button 60 as an input section are connected by means of a hinge 73. The image pickup apparatus 50 is incorporated below the display screen D2 inside the upper enclosure 71, and is arranged in such a way that light can be captured by the image pickup apparatus 50 from the outer surface of the upper enclosure 71.

This image pickup apparatus can be located above the display screen D2 inside the upper enclosure 71 or on the side thereof. It goes without saying that the mobile phone is not restricted to a collapsible structure.

Figure 27:
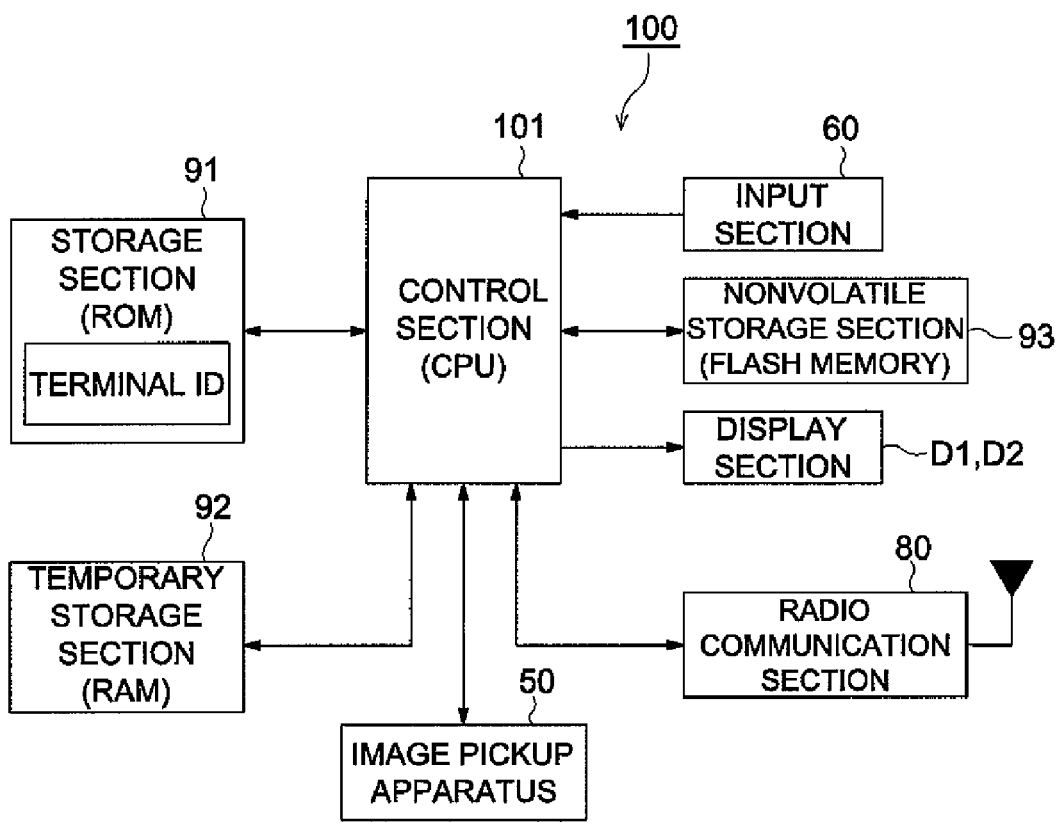
FIG. 27 is an example of the control block diagram of the mobile phone.

FIG. 27 is an example of the control block diagram of the mobile phone 100.

As shown in FIG. 27, the image pickup apparatus 50 is connected with the control section 101 of the mobile phone 100 by means of an external electrode (not illustrated) and outputs such image signals as a brightness signal and color difference signal to the control section 101.

In the meantime, the mobile phone 100 includes:

a control section (CPU) 101 that provides comprehensive control over each section and executes a program in conformity to each processing;

an operation button 60 as an input section for inputting the instructions in the form of numerical values and others;

display screens D1 and D2 for displaying predetermined data and images having been captured;

a radio communication section 80 for exchanging various forms of information with an external server;

a storage section (ROM) 91 for storing the system program of the mobile phone 100, various forms of processing programs, and required data such as terminal ID; and a temporary storage section (RAM) 92 for temporarily storing various forms of processing programs and data to be executed by the control section 101, processing data, and image data by the image pickup apparatus 50, wherein this temporary storage section (RAM) 92 is also used as a work area.

The image signal inputted from the image pickup apparatus 50 is stored in the nonvolatile storage section (flash memory) 93 by means of the control section 101 of the mobile phone 100, or is displayed on the display screens D1 and D2. Alternatively, this signal is also sent to an external device as image information by means of the radio communication section 80.

DESCRIPTION OF REFERENCE NUMERALS

50 Image pickup apparatus
100 Mobile phone
I Solid pickup element
KD Lens barrel
L1 First lens
L2 Second lens
L3 Third lens
L4 Fourth lens
L5 Fifth lens
P Substrate
S Aperture stop

The invention claimed is:

1. An image pickup lens for forming a subject image on a photoelectric conversion section of a solid image pickup element, the image pickup lens comprising, in order from an object side thereof:

a first lens having a positive refractive power with a convex surface on the object side;

a second lens having a negative refractive power with a concave surface on an image side;

a third lens having a positive refractive power with a convex surface on the image side;

a fourth lens having a positive refractive power and a meniscus shape with a convex surface on the image side; and a fifth lens having a negative refractive power with a concave surface on the image side, wherein the surface of the fifth lens on the image side is aspherical, and an inflection point is located at a position other than an intersection point with an optical axis; an aperture stop is located closer to the image than the first lens, and the conditional expression (1) is met:

$$0.8 < f3/f1 < 2.6 \quad (1)$$

wherein f3 is a focal distance of the third lens and f1 is a focal distance of the first lens.

2. The image pickup lens described in claim 1, wherein the aperture stop is arranged between the first lens and the second lens.

3. The image pickup lens described in claim 1, wherein the aperture stop is located between the second lens and the third lens.

4. The image pickup lens described in claim 1, wherein the following conditional expression (2) is satisfied:

$$50 < v3 < 72 \quad (2)$$

wherein v3 denotes an Abbe's number of the third lens.

5. The image pickup lens described in claim 1, wherein the following conditional expression (3) is satisfied:

$$0.0 < (R5+R6)/(R5-R6) < 2.5 \quad (3)$$

where R5 denotes a curvature radius of the surface of a third lens on the object side, and R6 denotes a curvature radius of the surface of a third lens on the image side.

6. The image pickup lens described in claim 1, wherein the following conditional expression (4) is satisfied:

$$-0.7 < R7/f < -0.3 \quad (4)$$

wherein R7 denotes a curvature radius of a fourth lens on the object side, and f indicates a focal distance of an entire image pickup lens system.

7. The image pickup lens described in claim 1, wherein the following conditional expression (5) is satisfied:

$$-0.7 < f5/f < -0.3 \quad (5)$$

wherein f5 indicates a focal distance of the fifth lens, and f indicates a focal distance of the entire image pickup lens system.

8. The image pickup lens described in claim 1, wherein a surface of the second lens on the image side is designed in such an aspherical shape that the negative refractive power is smaller at a position father from the optical axis toward a periphery.

9. The image pickup lens described in claim 1, wherein the following conditional expression is met:

$$15 < v2 < 31 \quad (6)$$

wherein v2 denotes an Abbe's number of the second lens.

10. The image pickup lens described in claim 1, wherein the following conditional expression (7) is met:

$$1.60 < N2 < 2.10 \quad (7)$$

wherein N2 indicates a refractive index of the second lens.

11. The image pickup lens described in claim 1, wherein adjustments of a focal point position in an auto-focusing and macro switchover functions of the image pickup lens are performed by moving the first through third lenses, and the following conditional expression (8) is met:

$$0.04 < D6/f < 0.25 \quad (8)$$

wherein D6 denotes an on-axis air clearance of the third and fourth lenses and f indicates a focal distance of an entire image pickup lens system.

12. The image pickup lens described in claim 1 except that the following conditional expression (9) is met:

$$\theta_{EH} < 60° \quad (9)$$

wherein $\theta_{EH}$ denotes the visual angle of the surface at the effective diameter of the fifth lens on the image side The conditional expression (9) is intended for proper setting of the visible angle of the surface at the effective diameter of the fifth lens on the image side, and prevention of a ghost from occurring between both surfaces of the fifth lens.

13. The image pickup lens described in claim 1, wherein the following conditional expression (10) is met:

$$0.80 < \Sigma D/f < 1.25 \quad (10)$$

wherein $\Sigma D$ is the distance on the optical axis from the apex of the first lens on the object side to the apex of the fifth lens on the image side, and f is the focal distance of an entire image pickup lens system.

14. The image pickup lens described in claim 1, wherein the image pickup lens is totally made of plastics.

15. An image pickup apparatus comprising a solid pickup element for photoelectric conversion of a subject image and the image pickup lens described in any one of claims 1 through 14.

16. A portable terminal comprising the image pickup apparatus described in claim 15.

* * * * *